(12) United States Patent
Dorch et al.

(10) Patent No.: US 11,354,760 B1
(45) Date of Patent: Jun. 7, 2022

(54) ORDER POST TO ENABLE PARALLELIZED ORDER TAKING USING ARTIFICIAL INTELLIGENCE ENGINE(S)

(71) Applicant: ConverseNowAI, Austin, TX (US)

(72) Inventors: Jon Dorch, Austin, TX (US); Pranav Nirmal Mehra, Bangalore (IN); Vrajesh Navinchandra Sejpal, Bangalore (IN); Akshay Labh Kayastha, Karnataka (IN); Yuganeshan A J, Karnataka (IN); Ruchi Bafna, Bengaluru (IN); T M Vinayak, Bangaluru (IN); Vinay Kumar Shukla, Austin, TX (US); Rahul Aggarwal, Austin, TX (US)

(73) Assignee: ConverseNowAI, Austin, TX (US)

( * ) Notice: Subject to any disclaimer, the term of this patent is extended or adjusted under 35 U.S.C. 154(b) by 0 days.

(21) Appl. No.: 17/491,533

(22) Filed: Oct. 1, 2021

Related U.S. Application Data

(63) Continuation-in-part of application No. 17/464,425, filed on Sep. 1, 2021, which is a continuation-in-part of application No. 17/366,941, filed on Jul. 2, 2021, which is a continuation-in-part of application No. 17/184,207, filed on Feb. 24, 2021.

(51) Int. Cl.
| | |
|---|---|
| G06Q 50/12 | (2012.01) |
| G10L 15/18 | (2013.01) |
| G10L 15/22 | (2006.01) |
| G06Q 20/32 | (2012.01) |
| G06V 20/10 | (2022.01) |
| G06V 20/62 | (2022.01) |

(Continued)

(52) U.S. Cl.
CPC ........ *G06Q 50/12* (2013.01); *G06Q 20/3278* (2013.01); *G06V 20/10* (2022.01); *G06V 20/62* (2022.01); *G06V 40/172* (2022.01); *G10L 15/18* (2013.01); *G10L 15/22* (2013.01); *G10L 2015/088* (2013.01)

(58) Field of Classification Search
USPC .......... 704/246, 247, 251, 252, 275; 705/15
See application file for complete search history.

(56) References Cited

U.S. PATENT DOCUMENTS

| | | | |
|---|---|---|---|
| 5,357,596 | A | 10/1994 | Takebayashi et al. |
| 5,625,749 | A | 4/1997 | Goldenthal et al. |

(Continued)

*Primary Examiner* — Leonard Saint Cyr
(74) *Attorney, Agent, or Firm* — Shiv S. Naimpally; Grable Martin Fulton PLLC

(57) ABSTRACT

In some aspects, an order post detects, using one or more sensors, a presence of a customer, determines an identity of the customer, retrieves previous orders of the customer, indicates at least one item in the previous orders, receives an order comprising input that includes an utterance of the customer, modifies the utterance to create a modified utterance, sends the modified utterance to a software agent comprising a natural language processor and one or more classifiers, receives a predicted response to the modified utterance from the software agent, plays back the predicted response via the speaker, determines that the order is complete, receives payment information for the order from the customer, sends order data associated with the order to a restaurant, receives an indication from the restaurant that the order is ready for pickup, and instructs the customer to pick up the order.

20 Claims, 9 Drawing Sheets

(51) Int. Cl.
*G06V 40/16* (2022.01)
*G10L 15/08* (2006.01)

(56) References Cited

U.S. PATENT DOCUMENTS

| | | | |
|---|---|---|---|
| 6,330,539 | B1 | 12/2001 | Takayama et al. |
| 7,110,963 | B2 | 9/2006 | Negreiro |
| 9,129,289 | B2 * | 9/2015 | Vaughn ............... G06Q 30/06 |
| 9,626,703 | B2 | 4/2017 | Kennewick |
| 10,055,685 | B1 | 8/2018 | Arel et al. |
| 10,162,794 | B1 | 12/2018 | Arel et al. |
| 10,210,861 | B1 | 2/2019 | Arel et al. |
| 10,325,223 | B1 | 6/2019 | Arel et al. |
| 10,559,299 | B1 | 2/2020 | Arel et al. |
| 10,573,296 | B1 | 2/2020 | Arel et al. |
| 10,628,635 | B1 | 4/2020 | Carpenter et al. |
| 10,878,824 | B2 | 12/2020 | Carpenter et al. |
| 11,023,955 | B1 | 6/2021 | Carpenter et al. |
| 2002/0111881 | A1 * | 8/2002 | Walker ............... G07F 17/246 707/737 |
| 2003/0144846 | A1 | 7/2003 | Denenberg et al. |
| 2006/0076397 | A1 * | 4/2006 | Langos ............... G06Q 10/087 235/375 |
| 2007/0040026 | A1 * | 2/2007 | Vleet ............... G07G 1/14 235/383 |
| 2011/0131038 | A1 | 6/2011 | Oyaizu et al. |
| 2016/0078504 | A1 | 3/2016 | Kennewick |
| 2017/0160813 | A1 | 6/2017 | Divakaran et al. |
| 2018/0308100 | A1 * | 10/2018 | Haukioja ............... G06N 5/04 |
| 2019/0108566 | A1 * | 4/2019 | Coleman ............ G06Q 30/0633 |
| 2019/0251611 | A1 * | 8/2019 | Coleman ............ G06Q 30/0613 |
| 2019/0266561 | A1 | 8/2019 | Koeppel et al. |
| 2019/0378533 | A1 | 12/2019 | Chao |
| 2020/0034848 | A1 | 1/2020 | Seo et al. |
| 2020/0160850 | A1 | 5/2020 | Lin et al. |
| 2020/0226667 | A1 | 7/2020 | Kalaimani |
| 2020/0273089 | A1 | 8/2020 | Siefken et al. |
| 2020/0279556 | A1 | 9/2020 | Gruber et al. |
| 2020/0311804 | A1 | 10/2020 | Buckholdt et al. |
| 2021/0158407 | A1 * | 5/2021 | Mimassi ............ G06Q 30/0641 |

\* cited by examiner

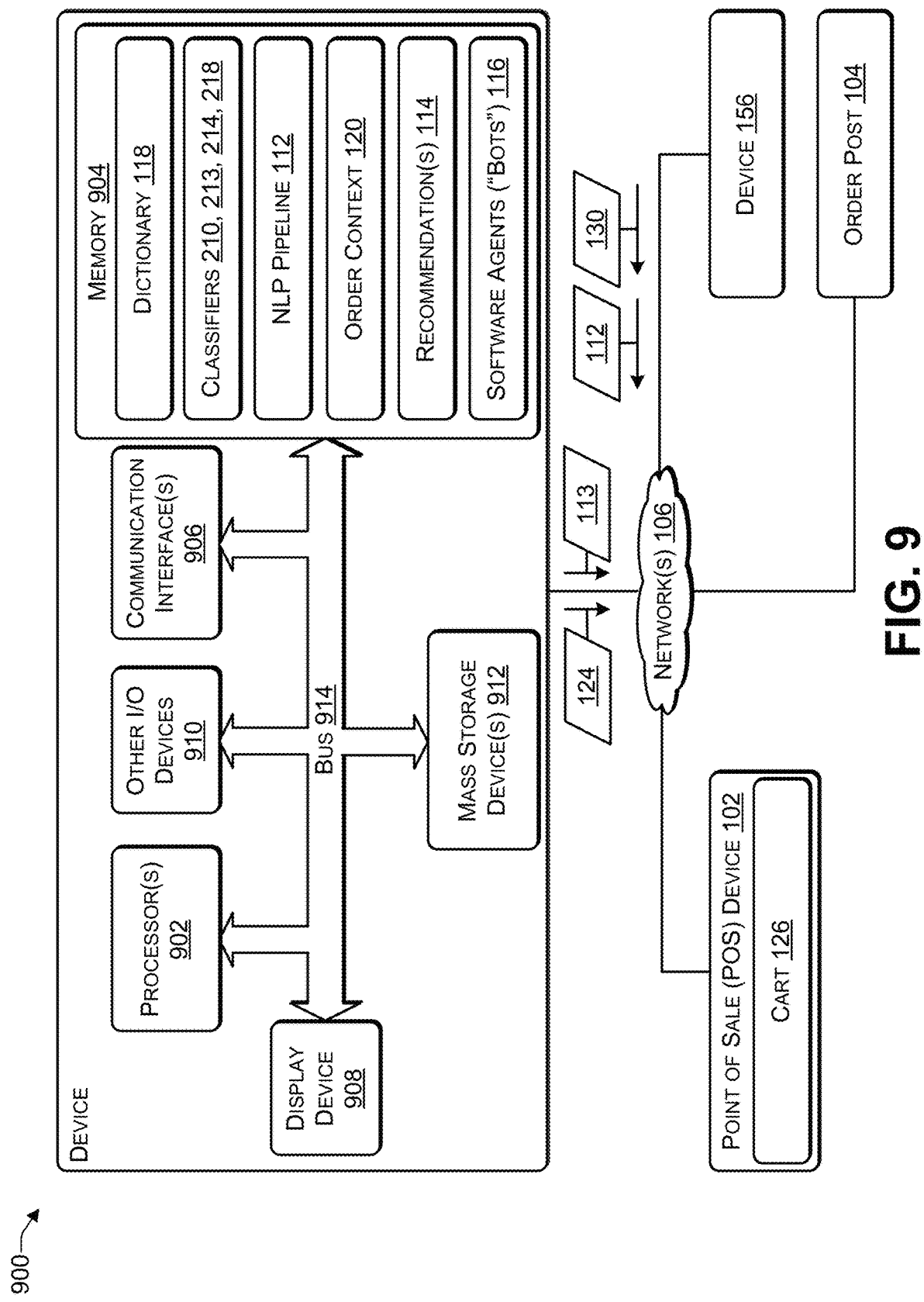

US 11,354,760 B1

ORDER POST TO ENABLE PARALLELIZED ORDER TAKING USING ARTIFICIAL INTELLIGENCE ENGINE(S)

CROSS-REFERENCE TO RELATED APPLICATIONS

The present patent application is a continuation-in-part of U.S. patent application Ser. No. 17/464,425 filed Sep. 1, 2021, entitled "USING MACHINE LEARNING TO CORRECT THE OUTPUT OF AN AUTOMATIC SPEECH RECOGNITION SYSTEM, which is a continuation-in-part of U.S. patent application Ser. No. 17/366,941 filed on Jul. 2, 2021, entitled "AUTOMATED ORDERING SYSTEM" which is a continuation-in-part of U.S. patent application Ser. No. 17/184,207, filed on Feb. 24, 2021, entitled "DETERMINING ORDER PREFERENCES AND ITEM SUGGESTIONS" all of which are incorporated by reference herein in their entirety and for all purposes as if completely and fully set forth herein.

BACKGROUND OF THE INVENTION

Field of the Invention

This invention relates generally to systems to order products and services and, more particularly to automated systems to order products and services.

Description of the Related Art

Restaurants face many challenges. One challenge is to efficiently take orders during peak demand times, such as breakfast (e.g., 6-LOAM), lunch (11 AM-1 PM), and dinner (4-7 PM). Some restaurants use "line busting" techniques to reduce wait times when customers are queued up during peak times. For example, a restaurant may deploy employees equipped with order taking tablets to take orders from customers waiting in a line (e.g., in a queue). If customers are in their vehicles waiting to go through a drive-through, the employees may end up being deployed outdoors (e.g., in the drive-through and/or parking area) in inclement weather (e.g., heat, rain, sleet, hail, snow, or the like). In addition, the employees are being deployed into an area in which moving vehicles are present, creating the possibility that one or more employees may come into contact with a vehicle and become injured.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, an order post includes: a speaker, one or more sensors, one or more processors, and a memory device to store instructions executable by the one or more processors to: detect, by the one or more sensors, a presence of a customer, determine an identity of the customer, retrieve one or more previous orders placed by the customer, indicate at least one item included in the one or more previous orders, receive an order from the customer where the order comprises input that includes an utterance of the customer, modify, using digital signal processing, the utterance to create a modified utterance, send the modified utterance to a software agent comprising a natural language processor and one or more classifiers, receive a predicted response to the modified utterance from the software agent, play back the predicted response via the speaker, determine that the order is complete, receive payment information for the order from the customer, send order data associated with the order to a restaurant, receive an indication from the restaurant that the order is ready for pickup, and instruct the customer to pick up the order.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 9 illustrates an example configuration of a computing device that can be used to implement the systems and techniques described herein.

DETAILED DESCRIPTION

Figure 1:
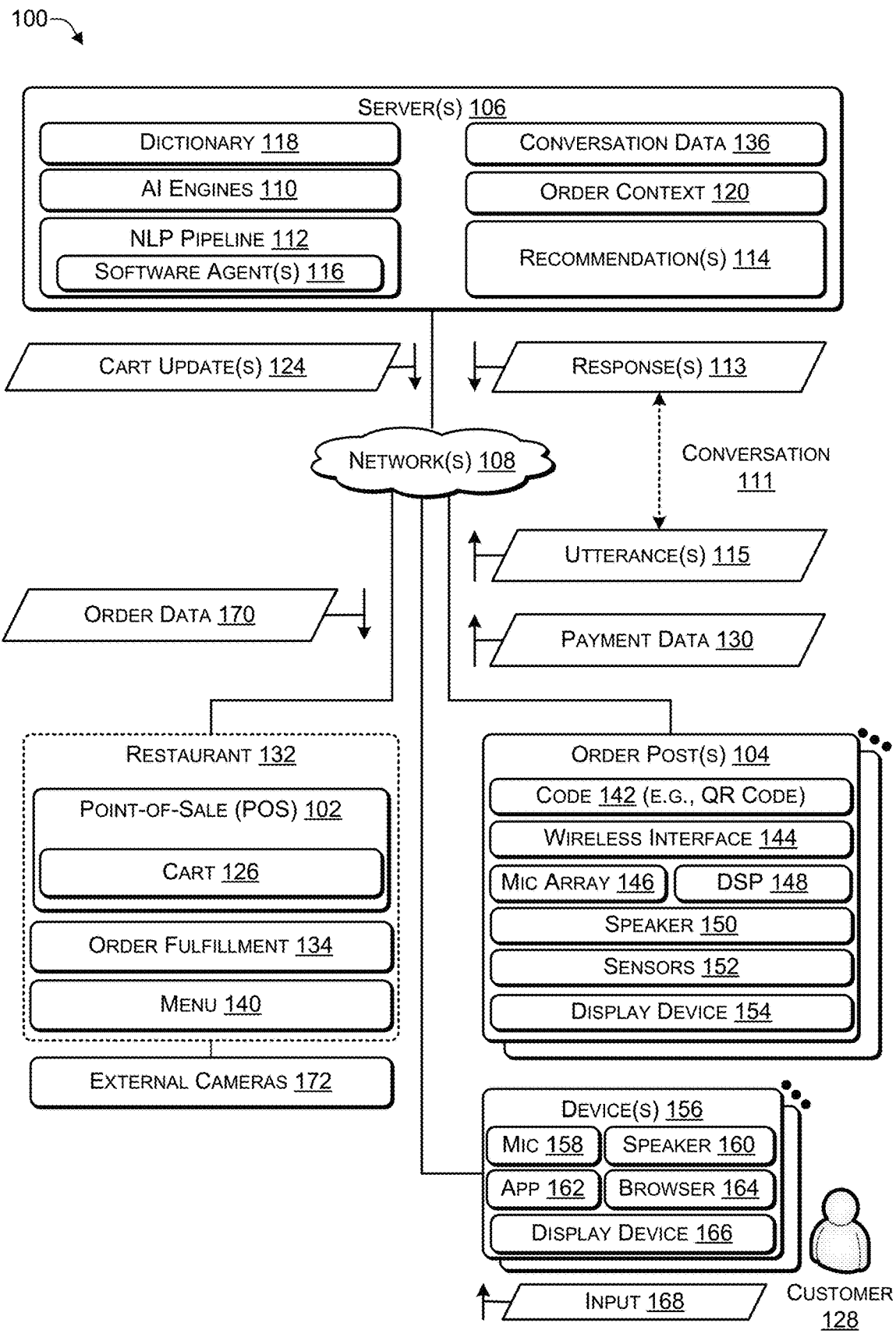
FIG. 1 is a block diagram of a system that includes one or more order posts in communication with a server hosting multiple artificial intelligence (AI) engines, according to some embodiments.

U.S. patent application Ser. No. 17/184,207 describes a system in which a machine learning algorithm (e.g., an artificial intelligence (AI) engine) monitors a conversation between a customer and an employee at a quick service restaurant (QSR). As the system is monitoring the conversation, the system interacts with a point-of-sale (POS) terminal to add, subtract, modify, or any combination thereof the contents of a cart. For example, if the customer is placing an order for one or more food items, the system may automatically add contents to the cart based on the customers voice input. To illustrate, if the customer says "Two large pepperoni pizzas" then the system automatically (e.g., without human interaction) adds two large pepperoni pizzas to the cart. Thus, the employee verbally interacts with the customer, without interacting with the point-of-sale terminal, and with the system interacting with the point-of-sale terminal. The employee observes the system modifying the contents of the cart while the employee is verbally interacting with the customer. The employee may interact with the point-of-sale terminal to make corrections if the system makes an error. The system may provide upsell suggestions to the employee to provide to the customer. The upsell suggestions may include increasing a size of an item ordered by the customer (e.g., "Would you like an extra-large instead of a large for just two dollars more?", adding an item (e.g., "Would you like to add something to drink?"), or both. The upsell suggestions may be provided to the employee via, for example, audibly (e.g., via an earpiece) or visually (e.g., displayed on the point-of-sale terminal). In addition, the system may be used to train new employees by prompting them as to what to say to the customer during a conversation to take an order.

The conversation data that includes the verbal interaction between the employee and the customer when the customer is placing an order is archived. The conversation data is used to train an AI engine to provide a software agent (e.g., sometimes referred to as a "chat bot"). By using a large quantity of conversation data between human employees and human customers to train the software agent, the software agent is able to mimic the way in which a human employee takes in order in such a way that the human customer may be unaware that they are interacting with a software agent rather than a human employee. In this way, a human employee is replaced by a software agent to take an order from a customer, thereby saving the restaurant money and increasing profit margins.

To address the large number of customers that arrive during peak times (e.g., around breakfast, lunch, and dinner), a restaurant may deploy order posts in an area that is proximate to the restaurant, such as drive-through lane(s), a parking lot, or the like, to enable customers lined up in their vehicles to place orders using the order posts. The order posts offer multiple advantages as compared to sending employees equipped with order-taking tablets into drive-through lanes and/or a parking lot to take orders from customers in their vehicles. First, employees are not sent out in inclement weather to take orders. Second, employees are not sent out in an area where vehicles are moving around and there is a possibility that the employees could be injured by the moving vehicles. Third, the restaurant may use fewer employees because the restaurant may not hire employees for deployment during peak ordering periods. Fourth, orders can be taken more quickly because multiple orders can be received via multiple order posts simultaneously (e.g., substantially at the same time). Fifth, more orders can be processed and enabling the restaurant to increase order throughput during peak times, thereby increasing the amount of revenue taken in during peak times. Sixth, customer satisfaction may be increased because, instead of waiting idly in their vehicles, customers are able to provide their order while their vehicle is in a queue, decreasing the time for the customer to receive their order.

In some cases, an individual order post may include a scannable (e.g., quick reference (QR)) code that when scanned by a customer's device (e.g., smartphone), automatically connects the device to a software agent to enable the customer to place an order. The code may include information, such as the name of the restaurant, a location where the restaurant specific application ("app") can be downloaded, a network site associated with the restaurant, a location of the restaurant (e.g., to enable the app or browser to open to a location-specific menu), a way of directly communicating with a software agent, other restaurant-related information, or any combination thereof. In some cases, scanning the code may cause the restaurant specific app to open up to an ordering page to enable the customer to use voice input and/or touch input on the touchscreen of the device to place an order. In other cases, scanning the code may cause a browser executing on the device to open to a restaurant specific ordering site to enable the customer to use voice input and/or touch input on the touchscreen of the device to place an order.

In some cases, an individual order post may include a microphone, a speaker, and one or more sensors. The order post may use the sensors to detect the presence of a customer by detecting the presence of the customer's vehicle (e.g., by using a camera sensor, a mass sensor, or the like). The order post may detect the presence of the customer by detecting (e.g., using Bluetooth or another nearfield communication technology) the presence of a customer device, such as a smartphone or a device built-in to the vehicle (e.g., that runs Apple® Car Play, Android® Auto, or the like). The microphone and speaker enable the customer to be connected to and place an order with a software agent. In some cases, the order post may include a touchscreen display device to enable the customer to use touch input and/or voice input to place an order with the software agent.

As an example, an order post may include a microphone, a speaker, one or more sensors (e.g., camera), one or more processors, and a memory device to store instructions executable by the one or more processors. The order post may include a communications interface comprising at least one of a cellular interface, a Wi-Fi interface, a Bluetooth interface, an Ethernet connection, or any combination thereof. The order post may include a transportation mechanism to enable the order post to temporarily moved to a particular location in a drive-through area or a parking lot area of the restaurant; and an anchor mechanism to enable the order post to temporarily anchored at the particular location. In some cases, the order post may be capable of travelling autonomously, using the transportation mechanism and the one or more sensors, within the drive-through area and/or the parking lot area of the restaurant. The order post includes a power source such as, for example, a rechargeable battery, one or more solar cells, a means for connecting the order post to a source of alternating current (A/C) power, or any combination thereof. In some cases, the order post is permanently located in a drive-through area and/or a parking lot area associated with the restaurant. The ordering post may include a status indicator to indicate whether the order post is available, unavailable, or out of service.

The order post may detect, using the one or more sensors, a presence of a customer, using, for example, vehicle recognition, facial recognition, voice recognition, device recognition, or the like. For example, the order post may determine, using the microphone, that the customer uttered a wake word or phrase (e.g., "Domino", "Chick-Fill", "I'd like to place an order", or the like). As another example, the order post may determine, using a camera of the one or more sensors, that a vehicle of the customer is within a predetermined distance of the order post. As a further example, the mic array may be used to perform voice recognition on the customer's voice. As yet another example, the order post may use a nearfield communication (NFC) technology to detect a presence of a device (e.g., smartphone or a device included in the vehicle) associated with the customer. The order post may determine an identity of the customer and retrieve one or more previous orders placed by the customer. For example, the order post may identify a license plate of a vehicle of the customer using a camera of the one or more sensors. As another example, the order post may perform facial recognition, using the camera of the one or more sensors, on a face of the customer. As yet another example, the order post may perform voice recognition, using a microphone of the one or more sensors, on the utterance of the customer (e.g., the utterance may include the customer saying the customer's name). As a further example, the order post may identify a device associated with the customer using a nearfield communication technology (e.g., Bluetooth), where the device is a smartphone of the customer or a smart interface device included in the vehicle of the customer. For example, the order post may determine and identify a mobile subscription identification number (MSIN) or similar identifier associated with the device.

The order post may indicate at least one item included in the one or more previous orders. For example, the at least one item may be included in greater than fifty percent of the one or more previous orders. The order post may receive an order from the customer where the order comprises input that includes an utterance of the customer. In some cases, the order post may include a touchscreen display device and the input may also include touch input received by the touchscreen display device. The order post may use digital signal processing (DSP) to modify the utterance to create a modified utterance. The DSP is used to modify the utterance to enable the software agent to perform speech-to-text conversion of the modified utterance. In some cases, the DSP may perform natural language processing (NLP) pre-processing, post-processing, or both. The order post may send the modified utterance to a software agent comprising a natural language processor and one or more classifiers. In some cases, the software agent is executed by the one or more processors of the order post while in other cases, the software agent is executed by a server that is connected to the order post via a network. The order post may receive a predicted response to the modified utterance from the software agent and play back the predicted response via the speaker and/or display the predicted response on a touchscreen display device of the order post. After determining that the order is complete, the order post may receive payment information for the order from the customer and send order data associated with the order to a restaurant. After receiving an indication from the restaurant that the order is ready for pickup, the order post may instruct the customer to pick up the order.

FIG. 1 is a block diagram of a system 100 that includes one or more order posts in communication with a server hosting multiple artificial intelligence (AI) engines, according to some embodiments. The system 100 includes a representative employee-assistance point-of-sale (EA-POS) device 102 at a representative restaurant 132, one or more order posts 104, one or more server(s) 106, and one or more consumer devices 156, connected to each other via one or more network(s) 108.

The server 106 may host (e.g., execute) one or more AI engines 110 (e.g., machine learning algorithms, such as classifiers), a natural language processing (NLP) pipeline 112, and one or more software agents 116. The server 106 may store a dictionary 118, conversation data 136, an order context 120, and provide recommendations 114.

Each of the order posts 104 may include one or more of a code 144 (e.g., quick reference (QR) code or the like), a wireless interface 144, a microphone array 146, a digital signal processing (DSP) module 148, a speaker 150, sensors 152, a display device 154, or any combination thereof. In some cases, one or more of the order posts 104 may be fixed at a particular location near the restaurant 132, such as in a drive-through area, a parking lot area, or the like. In some cases, one or more of the order posts 104 may be temporarily placed at a particular location near the restaurant 132. For example, a portable order post 104 may have a rechargeable battery (e.g., lithium-ion (LiOn)) or the like and a transportation mechanism (e.g., wheels) to enable the order post 104 to be temporarily placed (e.g., at a particular time, such as at the beginning of each day) at a particular location to handle increased drive-through traffic, e.g., instead of sending employees with ordering-taking tablets into the drive-through or parking lot area. At a particular time, such as at the end of each day, the portable order posts 104 may be transported (e.g., wheeled) back into the restaurant 132 and the rechargeable battery recharged for the next usage. One of the AI engines 110 may perform traffic management by (i) directing vehicles to particular order posts 104, (ii) directing vehicles to a pick-up window to pick up an order, (iii) activate and deactivate the order posts 104 based on an amount of traffic, or any combination thereof.

In some cases, the AI engines 110, the NLP pipeline 112, and the like may execute on at least one of the order posts 104. In such cases, one of the software agents 116 executing on a particular one of the order posts 104 may take an order from the customer 128 (e.g., via the conversation 111) and communicate order data 170 to the restaurant 132. In this way, the order posts 104 may perform order processing at the edge, without involving the server 106. The advantage of such an arrangement is that a local area network (LAN), such as a Wi-Fi network or the like, that includes the order posts 104 and the restaurant 132 is able to process orders, e.g., without using a wide area network (WAN). Such a system may be deployed where a WAN is unavailable, provides intermittent connectivity, or is cost prohibitive.

The device 156 may be a smartphone, tablet, or another type of computing device and may include a microphone ("mic") 158, a speaker 160, and a display device 166. In some cases, the display device 166 may include a touchscreen display device to enable a customer 128 to provide input 168. The device 156 may execute a browser capable of browsing the Internet. The browser 164 may be capable of navigating to a website associated with the restaurant 132 to enable the customer 128 to place an order. In some cases, the device 156 may include an application ("app") 162 associated with the restaurant. The app 162 may enable a user to connect with the restaurant 132 to place an order (e.g., by sending the order data 170 to the restaurant 132).

The customer 128 may use the customer device 156 to initiate an order to the restaurant 132. The order posts 104 may be deployed in an area near a restaurant, such as a drive-thru area, a parking area, or the like. In some aspects, the order post 104 may include a scannable code 142. A customer 128 may use the device 156 (e.g., a smartphone) to scan the code 142. The code 142 may include information, such as a name of the restaurant 132, a location of the restaurant 132, and other restaurant-related information. In some cases, scanning the code 142 may cause the device 156 to directly connect with one of the software agents 116, e.g., without opening the app 162 and without using the browser 164. For example, scanning the code 142 may cause the device 156 to display a large user interface (UI) element (e.g., "Press to order") that when touched, causes the device 156 to directly connect with one of the software agents 116.

Scanning the code 142 may cause the device 156 to determine whether the app 162 is installed on the device 156. The app 162 may be associated with the restaurant 132. For example, if the restaurant 132 is part of a particular restaurant chain, then the app 162 may be associated with the particular restaurant chain. If the app 162 is not installed, the device 156 may automatically navigate to a software store (e.g., app store) and ask the customer 128 whether to install the app 162 on the device 156. If the customer 128 indicates to install the app 162, then the device 156 may install the app 162, identify the location of the restaurant 132 based information included in the code 142, open a menu 140 in the app 162, and enable the customer 128 to place an order with the restaurant 132. If the app 162 is already installed, scanning the code 142 using the device 156 may cause the app 162 to automatically open, automatically select the restaurant 132 based on the location specified by the code 142, and automatically display the menu 140 to enable the customer 128 to place an order. If the app 162 is not installed on the device 156 and if the customer 128 indicates that the app 162 is not to be installed, then the device 156 may automatically open a browser 164 and navigate to a website of the restaurant 132 to enable the customer 128 to place an order.

As the customer 128 places an order with one of the software agents 116, the order post 104 or the device 156 may display text of what the customer is ordering, e.g., "hash browns and a cup of coffee" and display contents of the cart 126. In some cases, the device 156 may be a component of a vehicle in which the customer 128 is located. For example, the device 156 may run Apple® Car Play, Android® Auto, or the like. In such cases, the ordering process may use the handsfree capabilities of the device 156 built-in to the customer's vehicle.

In some aspects, the order post 104 may include the wireless interface 144. The wireless interface 144 uses a wireless technology, such as, for example, a cellular technology (e.g., code division multiple access (CDMA), global system for mobile (GSM), universal mobile telephone system (UMTS), or the like), Wi-Fi, Bluetooth, another type of wireless technology, or any combination thereof, to communicate with the server 106 via the network 108. The wireless interface 144 may enable the order post 104 to communicate (e.g., via the network 108) with one of the software agents 116 on the server 106. For example, one of the software agents 116 may interact with a customer 128 to obtain the order data 170.

The customer 128 may place an order by speaking towards the order post 104. In some cases, the order post 104 may respond to a "wake word" (Domino, Chick-fill, or the like) or "wake phrase" ("I'd like to order" or "I'd like to place an order") that, when spoken by the customer 128, causes the order post 104 to enter into an order-taking mode. A wake word is a special word or phrase that, when spoken, is used to activate the order post 104. The order post 104 may capture utterances of the customer 128 using the microphone array 146. The microphone array 146 may include one or more microphones positioned in such a way that utterances from customers located in vehicles having different heights and located different distances from the order post 104 may be captured. For example, one of the microphones in the microphone array 146 may be used to capture ambient sounds in the surrounding area for noise cancellation purposes and used to remove noise from the audio captured by a remainder of the microphones in the microphone array 146. To illustrate, a phase of the audio (e.g., noise) captured by one of the microphones may be inverted (e.g., 180 degrees out of phase) relative to a phase of the audio captured by the remaining microphones to provide noise cancellation. In some cases, the audio may be filtered prior to inverting the phase. For example, in some aspects, a filter may be used to filter out voice frequencies in the phase of the non-voice frequencies may be inverted and mixed with the audio captured by the remaining microphones. In some aspects the digital signal processing module (DSP) module 148 may be used to modify frequencies and/or a phase of the audio captured by the microphone array 146 for better understanding of the utterances 115 by the AI engines 110. For example, the DSP module 148 may be used to perform noise cancellation. Thus, the DSP module 148 may modify the audio received by the microphone array 146 to increase machine intelligibility (e.g., rather than human intelligibility). The speaker 150 may be used to provide audio output of the responses 113 from the software agent 116.

One or more employees of the restaurant 132 may wear headsets that enable each employee to listen in to the conversation 111 between the customer 128 and one of the software agents 116. In this way, as the customer 128 is placing the order, the employee can begin preparing food items, assembling the order, and the like. For example, if the customer 128 says "large cola", then the employee, hearing this, can begin filling a large cup with cola. If the customer 128 says "large fries", then the employee can, grab large fries if available and if no fries are available, begin deep frying frozen French fries.

In some cases, the order post 104 may include sensors 152 to detect the presence of a customer (e.g., determine when a customer's vehicle is within a pre-determined distance of the order post) and/or enable the order post 104 to function as an autonomous vehicle that moves from one vehicle to a next vehicle in an area (e.g., drive-through, parking lot, or the like). For example, the sensors 152 may include a camera, a directional Bluetooth sensor, a mass sensor, another type of sensor or any combination thereof. The order post 104 may use the wireless interface to connect to one or more external cameras 172 that are external to the order post 104, e.g., the external cameras 172 are placed in such a way as to provide higher elevation (e.g., aerial) views of portions of the parking area and drive through area around the restaurant 132. If the order post 104 is configured as an autonomous vehicle, the one or more external cameras 132 may enable the order post 104 to identify a next vehicle to attend to and a path to enable the order post 104 to navigate to the next vehicle. To enable the order post 104 to move as an autonomous vehicle, the sensors 152 may include radar sensors, light detection and ranging (lidar) sensors, laser sensor, other types of sensors used by autonomous vehicles, or any combination thereof. In some cases, the camera may take a picture of the license plate of a vehicle in which the customer 128 is located and, if the customer 128 has previously given permission, look up the license plate to identify the customer 128. In some cases, the camera sensor may be used to perform facial recognition of the driver to identify the customer 128. In some cases, the microphone may gather the sound of the customer's voice and use voice recognition to recognize the customer. For example, the customer 128 may speak their name "Hi, this is John Smith" and the order post 104 may use voice recognition to recognize the customer 128. Thus, the order post may use facial recognition (e.g., using a camera sensor to recognize a face of the driver or an occupant of the vehicle), vehicle recognition (e.g., using a camera sensor to recognize a license plate of the customer's vehicle), device recognition (e.g., recognizing the device 156 using nearfield communication (NFC), such as Bluetooth or the like), or any combination thereof.

In some aspects, the order post 104 may include the display device 154. The display device 154 may be used to display items from the menu 140, items that the customer 128 previously ordered (if the customer 128 is recognized), upsell items (e.g., display a hot item, such as a piece of pie or a cup of hot cider, when the weather is cold or display a cold item, such as an ice cream sundae or a milkshake, when the weather is hot), and the like. In some cases, the display device 154 may be touch sensitive and may be capable of receiving input 168 from the customer 128. For example, the customer 128 may place an order (e.g., send the order data 170) using a combination of the utterances 115 and the input 168 received by the display device 154. The display device 154 may be used to train/prompt the customer 128 as to how to interact with the software agents 116, such as displaying "You can say things like 'I'd like to order 2 chocolate milkshakes'" or the like.

In some cases, a human employee may receive the order and the AI engine 110 may monitor the conversation 111, including the utterances 115 of the customer and responses 113. Initially, the responses 113 may be from a human employee of the restaurant 132. The AI engine 110 may determine which items from a menu 136 of the restaurant 132 the customer is ordering. The AI engine 110 may monitor the conversation 111 between the customer and the employee and automatically (e.g., without human interaction) modify a cart 126 hosted by the EA-POS device 102. In other cases, a human employee may receive the order, the AI engine 110 may monitor the conversation between the customer and the employee, and monitor what the employee enters into the EA-POS device 102. The employee entries may be used as labels when training the AI engine 110 and various machine learning (ML) models in the NLP pipeline 112. The AI engine 110 may use a dictionary 118 to identify words in the conversation. The AI engine 110 may keep a running track of an order context 120 associated with each particular order. The order context 120 may include order data associated with previously placed orders by each customer, trending items in a region in which the customer is located, specials/promotions (e.g., buy one get one free (BOGO), limited time specials, regional specials, and the like) that the restaurant 132 is currently promoting (e.g., on social media, television, and other advertising media), and other context-related information.

The customer may use a payment means, such as a digital wallet, to provide payment data to complete the order. In response, the restaurant 132 may initiate order fulfillment 134 that includes preparing the ordered items for take-out, delivery, or in-restaurant consumption. Such conversations between human employees and customers may be stored as conversation data 136. The conversation data 136 is used to train a machine learning algorithm (e.g., the software agent 116) to take orders from customers in a manner similar to a human employee, such that the customers may be unaware that they are interacting with the software agent 116 rather than a human employee.

Subsequently (e.g., after the software agent 116 has been trained using the conversation data 136), when the customer 128 uses the customer device 156 or the order post 104 to initiate a communication to the restaurant 132 to place an order, the communication may be routed to the software agent 116. The customer 128 may have a conversation 111 that includes utterances 115 of the customer 128 and responses 113 by the software agent 116. In such cases, the conversation 111 may not include an employee of the restaurant. The conversation may be routed to a human being (e.g., employee) under particular conditions, such as due to an inability of the software agent 116 to complete the conversation 111, a server malfunction, or the like.

The conversation 111 may include voice input (e.g., received via the microphone array 146 or the microphone 158), input 168 (e.g., received via the display device 154 or the display device 166), or another type of input provided by the customer 128 using the order post 104 or the device 156. For example, in some cases, the conversation 111 may include the voice of the customer in the form of the utterances 115 and the responses 113 of the software agent 116. In some cases, the responses 113 may be vocalized (e.g., converted into a synthesized voice) using text-to-speech technology. One or more of the utterances 115 may result in the server 106 sending a cart update 124 to update a cart 126 at the point-of-sale device 102. The AI engine 110 may determine (e.g., predict) recommendations 114 that the software agent 116 provides in the responses 113 as part of the conversation 111. For example, the recommendations 114 may be based on items that the customer has previously ordered, items that are currently popular in the customer's region (e.g., zip code, city, county, state, country, or the like), and the like. To determine items that the customer previously ordered, the AI engine 110 may determine an identity of the customer based on, for example, an identifier (e.g., a phone number, an Internet protocol (IP) address, caller identifier, or the like) associated with the customer device 156, voice recognition, facial recognition (e.g., in the case of a video call), or another identifying characteristic associated with the order initiated by the customer device 156.

After the customer has completed an order, the customer may provide payment data 130, for example using an account (e.g., bank account, credit card account, debit card account, gift card account, or the like) stored in a digital wallet. The payment data 130 may be sent to the point-of-sale device 102 to complete a checkout process for the cart 126. After the payment data 130 has been received and the payment data processed, the restaurant 132 may initiate order fulfillment 134, such as preparing the items in the order for take-out, delivery, in-restaurant dining, or the like.

The system 100 is configured to enable the interactions between human customers and software agents 116 to be natural and human-like to such a degree that the human customers may conclude that they interacted with a human rather than a software agent. The software agents 116 engage in human-like conversations in which the software agents 116 exhibit flexibility in the dialog. The software agents 116 are trained, based on the conversation data, to have an understanding of complex natural language utterances that take into account the nuances of oral and written communications, including both formal communications and informal communications. The term 'utterance' may include anything spoken or typed by a customer, including a word, a phrase, a sentence, or multiple sentences (including incomplete sentences that can be understood based on the context).

The system 100 includes a voice ordering system that takes the utterances 115 of a customer and processes the utterances 115 through the Natural Language Processing (NLP) pipeline 112 (also referred to as a Natural Language Understanding (NLU) pipeline). The output of the NLP pipeline 112 are used by the server 106 to select: (1) a next one of the responses 113 that the software agent 116 provides the customer in the conversation 111 and (2) the cart updates 124 to update the cart 126.

The systems and techniques described herein provide a data-driven approach to the NLP pipeline 112. The conversation data 136 includes hundreds of thousands of conversations between a human customer and a human employee and is used to train a supervised machine learning model (e.g., the software agents 116) to make the responses 113 of the software agents 116 as human-like as possible. The conversation data 136 includes human-to-human conversations used to train a domain specific language model (e.g., the software agents 116). The systems and techniques described herein take advantage of newly available language models that provide a greater capacity for leveraging contextual information over the utterances 115 (e.g., a word, a phrase, a sentence, or multiple sentences including incomplete sentences).

The conversation data between customers and human employees may be stored to create a database of conversations associated with, for example, ordering food at a quick service restaurant. The database of conversation data may be gathered over multiple months or years and used to train a machine learning algorithm, such as a software agent, to automatically take an order from a customer as if the customer was having a conversation with a restaurant employee. For example, given a conversation context and an utterance from the customer, the software agent determines and verbalizes (e.g., using text-to-speech) an appropriate and automated response using a natural language processing pipeline.

Thus, a system may include an automated ordering system to enable customers to initiate and complete an order using voice input, touch input, text, or the like. By deploying one or more order posts in an area that is proximate to the restaurant, such as drive-through lane(s), a parking lot, or the like, customers lined up in their vehicles during peak times can place orders using the order posts. The system offers multiple advantages as compared to sending employees equipped with order-taking tablets into drive-through lanes and/or a parking lot to take orders from customers in their vehicles. First, employees are not sent out in inclement weather to take orders. Second, employees are not sent out in an area where vehicles are moving around and there is a possibility that the employees could be injured by the moving vehicles. Third, the restaurant may use fewer employees because the restaurant may not hire employees for deployment during peak ordering periods. Fourth, orders can be taken more quickly because multiple orders can be received via multiple order posts simultaneously (e.g., substantially at the same time). Fifth, more orders can be processed and enabling the restaurant to increase order throughput during peak times, thereby increasing the amount of revenue taken in during peak times. Sixth, customer satisfaction may be increased because, instead of waiting idly in their vehicles, customers are able to provide their order while their vehicle is in a queue, decreasing the time for the customer to receive their order.

Figure 2:
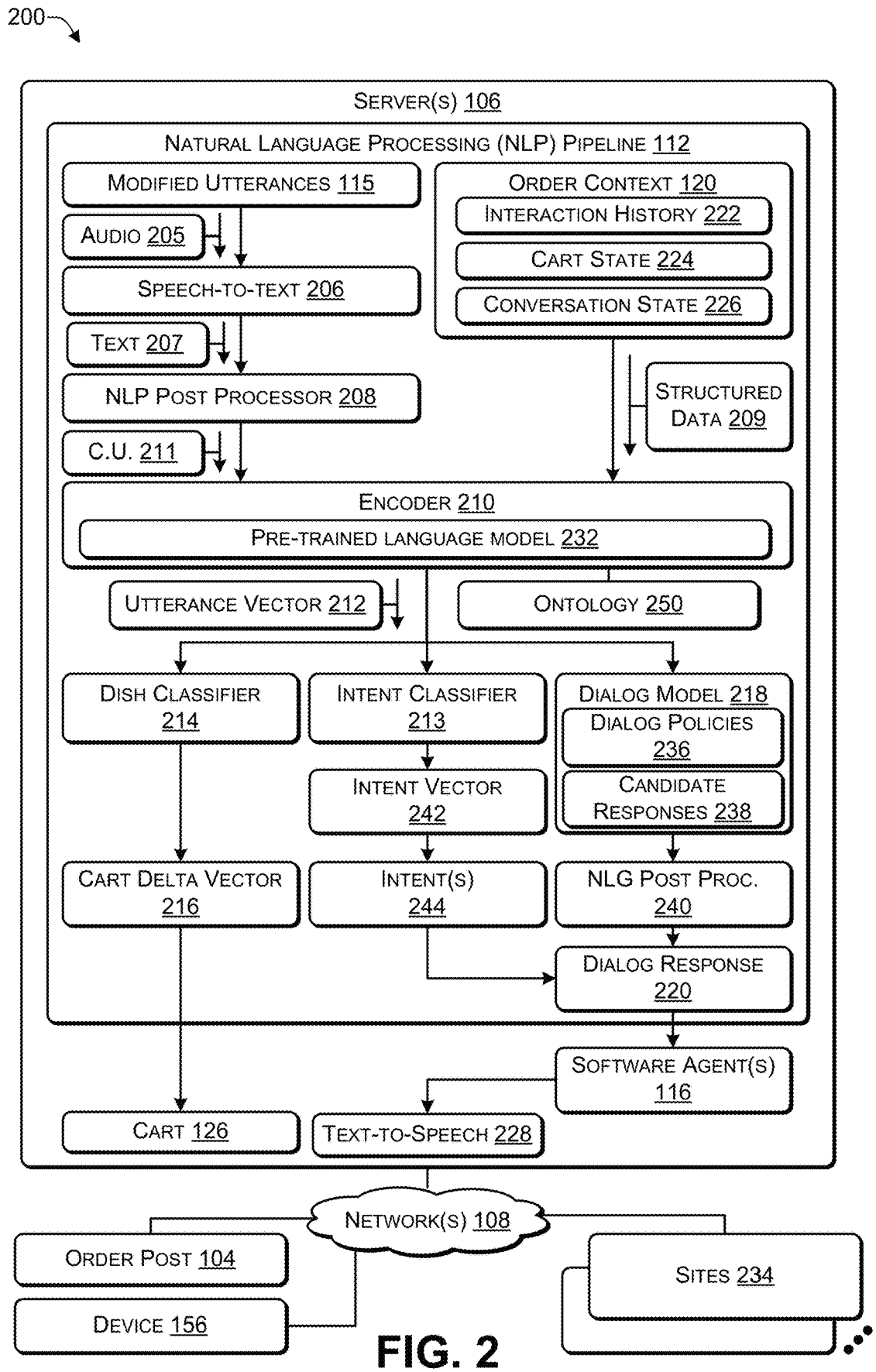
FIG. 2 is a block diagram of a natural language processing (NLP) pipeline, according to some embodiments.

FIG. 2 is a block diagram 200 of the natural language processing (NLP) pipeline 112 of FIG. 1, according to some embodiments. The NLP pipeline 112 may receive the utterances 115 of a customer (e.g., from the order post 104 or from the customer device 156 of FIG. 1). The NLP pipeline 112 may process audio data 205 that includes at least a portion of the utterances 115 using a speech-to-text converter 206 to convert the audio data 205 to text 207. For example, the utterances 115 may be "I would like 2 large pizzas with peperoni and mushrooms."

The order context 120 may include an interaction history 222 between the software agent 116 and the customer, a current cart state 224, and a conversation state 226. The interaction history 222 may include interactions between the customer and one of the software agents 116, including the utterances 115 of the customer and the responses 113 of the software agent 116. The cart state 224 identifies a state of the customer's cart including, for example, items in the cart, how many of each item is in the cart, a price associated with each item, a total price associated with the cart, whether payment has been received (e.g., whether the cart has been through check out), a most recent change (e.g., addition, subtraction, or modification) to one or more items in the cart, other cart related information, or any combination thereof. The conversation state 226 may indicate a state of the conversation between the customer and the software agent 116, such as whether the conversation is in progress or has concluded, whether the customer is asked a question and is waiting for a response from the software agent 116, whether the software agent 116 has asked a question and is waiting for a response from the customer, a most recent utterance from the customer, a most recent response from the software agent 116, other conversation related information, or any combination thereof.

The utterances 115 are provided by a customer that has contacted the restaurant 132 of FIG. 1 to place an order. The utterances 115 are in the form of the audio data 205. The speech-to-text converter 206 converts the audio 205 into text 207. The text 207 is processed using an NLP post processor 208 that makes corrections, if applicable, to the text 207 to create corrected utterances 209. For example, the text 207 may include an incorrect word that is plausible in the context and multiple similar sounding words may be equally plausible. The NLP post processor 208 may make corrections by identifying and correcting one or more incorrect words in the text 207 to create corrected utterances 209. After the NLP post processor 208 processes the text 207, the corrected utterances 209 are sent to the encoder 210.

The order context 120, including the interaction history 222, the cart state 224, and the conversation state 226, are provided to the encoder 210 in the form of structured data 209. The structured data 209 includes defined data types that enable the structured data 209 to be easily searched. Unstructured data is raw text, such as "two pizzas with sausage and pepperoni". Structured data may use a structured language, such as JavaScript Object Notation (JSON), Structured Query Language (SQL), or the like to represent the data. For example, "two pizzas with sausage and pepperoni" may be represented using structured data as: {"Quantity": 2, "Item": "Pizza", "Modifiers": ["Pepperoni", "Sausage" ] }. In structured data 209, each data item has an identifier or some fixed structured meaning and is not subject to natural language meaning or interpretation. The order context 120 captures where the customer and the software agent 116 are in the conversation 111 (e.g., what has already been said), what items are in the cart 126, and the like.

An encoder 210 of the NLP pipeline 112 receives the text 207 and the structured data 209 as input and predicts an utterance vector 212. The encoder 210 may include a pre-trained language model 232 that predicts, based on the most recent utterances 115 and the current order context 120, (1) how the cart 126 is to be modified and (2) what the software agent 116 provides as a response, e.g., dialog response 220. The encoder 210 is a type of machine learning model that uses a Bidirectional Encoder Representations from Transformers (BERT), e.g., a transformer-based machine learning technique for natural language processing (NLP), to predict the utterance vector 212. The encoder 210 may be a pre-trained language model 232 that converts the text 207 of the utterances into a vector of numbers. The pre-trained language model 232 may be fine-tuned to a specific domain, e.g., to ordering at a restaurant and that too, at a specific type of restaurant (e.g., pizza, wings, tacos, etc.). The training is based on the conversation data 136 that has been gathered over time between customers and employees who enter data in the EA-POS 102. The employee entered data may be used as labels for the conversation data 136 when training the various machine learning models described herein. The pre-trained language model 232 associates a specific utterance, e.g., "I want chicken wings", with a specific action, e.g., entering a chicken wing order into the EA-POS 102. The pre-trained language model 232 predicts what items from the menu 136 are to be added to the cart 126 (e.g., based on one or more actions associated with the utterance 115) and which items are to be removed from the cart 126, and quantities associated with the items that are to be added and/or removed. In some aspects, the encoder 210 may be implemented as a multi-label classifier. Modifiers may include, for example, half pepperoni, half sausage, double cheese, and the like. In some cases, the pre-trained language model 232 may be structured hierarchically, e.g., with pizza at a high level and modifiers at a lower level. Alternately, the pre-trained language model 232 may use a flat system with every possible combination as a unique item.

The utterance vector 212 may be used by three classifiers (e.g., a type of machine learning algorithm, such as a support vector machine or the like), including the dish classifier, the intent classifier 213, and the dialog model 218. For example, the utterance vector 212 may be used by the dish classifier 214 to predict a multiclass cart delta vector 216. The multiclass cart delta vector 216 is used to modify the cart 126. For example, in the cart delta vector 216, the first position may indicate a size of the pizza, e.g., 1=small, 2=medium, 3=large, the second position may indicate a type of sauce, e.g., 0=no sauce, 1=1st type of sauce, 2=2nd type of sauce, the third position may indicate an amount of cheese, e.g., 0=no cheese, 1=normal cheese, 2=extra cheese, 3=double cheese, and the remaining positions may indicate the presence (e.g., 1) or the absence (e.g., 0) of various toppings, e.g., pepperoni, mushrooms, onions, sausage, bacon, olives, green peppers, pineapple, and hot peppers. Thus, (3, 1, 1, 1, 0, 0, 0, 0, 0, 0, 0, 0) is a vector representation of a large pizza with the first type of sauce, a normal amount of cheese, and pepperoni. If the utterances 115 includes "I'd like double cheese", then the vector representation may change to (3, 1, 3, 1, 0, 0, 0, 0, 0, 0, 0, 0), resulting in a corresponding change to the cart 126. Of course, this is merely an example and other vector representations may be created based on the number of options the restaurant offers for pizza size, types of sauces, amount of cheese, toppings, and the like.

The encoder 210 outputs the utterance vector 212 which a dialog model 218 uses to determine a predicted dialog response 220. For example, based on the order context 120 and the most recent utterances 115, the encoder 210 may determine the predicted response 220. The predicted response 220 is a prediction as to what a human employee would say at that point in the conversation (e.g., order context 120) based on the customer's most recent utterances 115. The encoder 210 is trained using the conversation data 136 to predict the dialog response 220 based on the utterances 115 and the order context 120. The software agent 116 converts the predicted dialog response 220 to speech using a text-to-speech converter 228. The dialog model may use dialog policies 236 and candidate responses 238 to predict the dialog response 220. In some cases, a natural language generation (NLG) post processor 240 may modify the output of the dialog model 218 to create the dialog response 220. For example, the NLG post processor 240 may modify the dialog response 220 to include local colloquialisms, more informal and less formal dialog, and the like.

Figure 5:
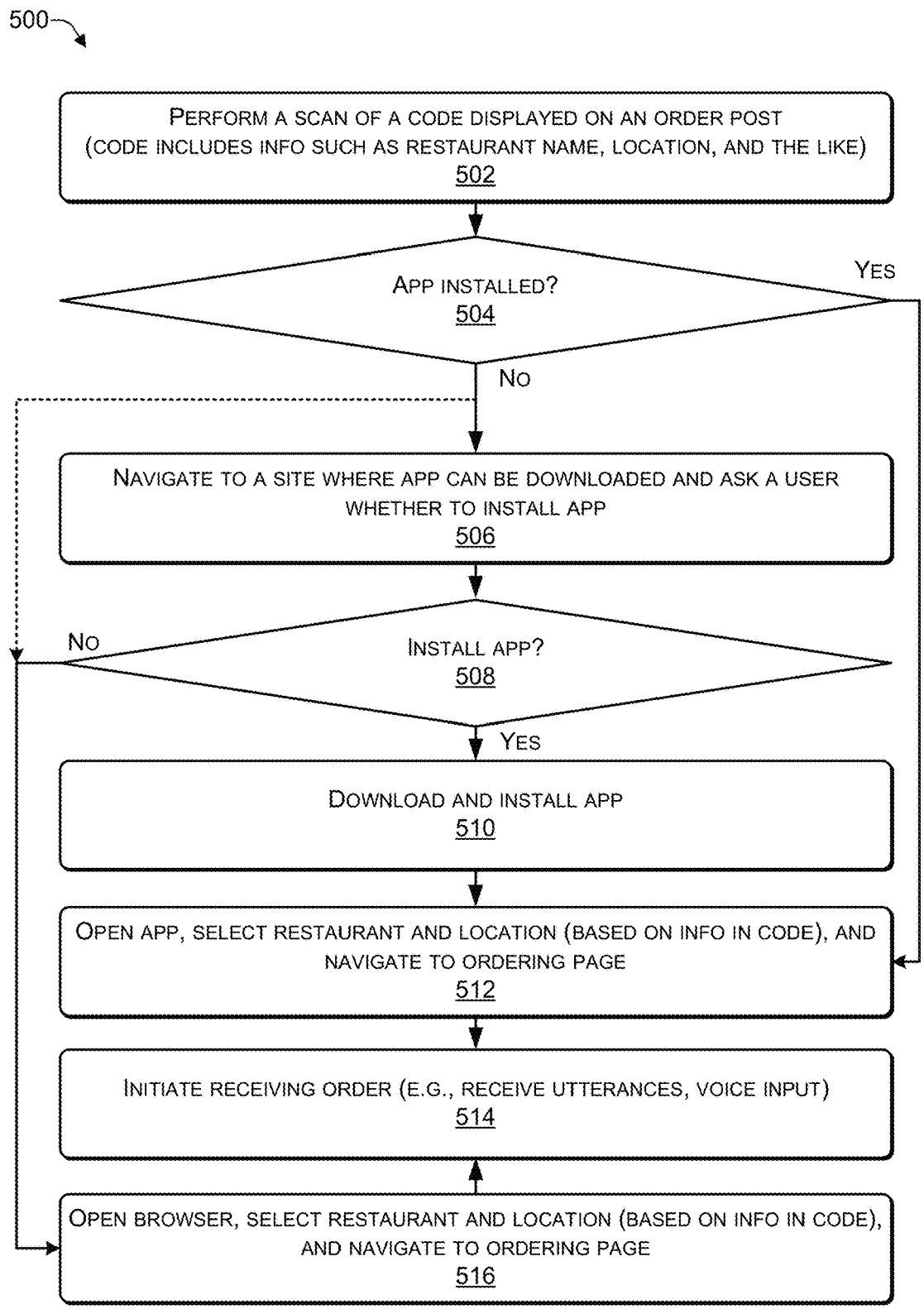
FIG. 5 is a flowchart of a process that includes receiving a scan of a code displayed on an order post, according to some embodiments.

During training of the machine learning model used to create the software agents 116, the human-to-human conversations in the conversation data 136 of FIG. 1 are labelled to fine tune the language model 232, as described in more detail in FIG. 5. The utterances 115 and the order context 120 (e.g., contextual language information and current cart information up to a given point time) are encoded (e.g., into the utterance vector 212) to provide the cart delta vector 216 (e.g., a delta relative to the cart 126) as well as the next predicted dialog response 220. The cart delta vector 216 identifies the steps to update the cart 126. The codified delta over the cart indicates the steps to update the cart 126 and is the label that the human operator creates when handling the conversation that afterwards becomes the training dataset. For example, the encoder 210 is able to associate a specific utterance of the utterances 115, such as "I want chicken wings", with a specific action, e.g., entering a chicken wing order into the cart 126. The encoder 210 predicts what items should be added to the cart 126 (e.g., based on the action associated with the utterance) and which items should be removed from the cart 126, and any associated quantities. In some aspects, the encoder 210 may use a multi-label classifier, such as for example, decision trees, k-nearest neighbors, neural networks, or the like. In a multi-label classifier, modifiers may include, for example, half-pepperoni, half-sausage, double cheese, and the like. In some cases, the order may use hierarchical structures, with each particular type of order, such as pizza, wings, taco, or the like, at a highest level and modifiers at a lower level in the hierarchy. For example, pizza may be at the highest level while half-pepperoni, half-sausage, double cheese, and the like may be at a lower level. In other cases, the order may use a flat system with every possible combination as a unique item. For example, (a) half-pepperoni may be a first item, (b) half-sausage may be a second item, (c) double cheese may be a third item, (d) half-pepperoni and half-sausage may be a fourth item, (e) half-pepperoni, half-sausage, and double cheese may be a fifth item, and so on.

The intent classifier 213 takes the utterance vector 212 as input and creates an intent vector 242 that represents intent(s) 244 of the utterances 115. The dialog model 218 uses the utterance vector and the intents 238 to create the dialog response 220. The dialog model 218 predicts the dialog response 220, the response that the software agent 116 to the utterance 115. In contrast, in a conventional voice-response system, the system uses a finite state machine. For example, in a conventional system, after each utterance, the system may ask for a confirmation "Did you say 'combo meal'? In the system of FIG. 2, a predictive model predicts the dialog response 220 based on the utterance 115 and the order context 120.

The dish classifier 214 predicts which items from the menu 126 the customer is ordering and modifies the cart 126 accordingly. For example, in the utterance "Can I have 2 pizzas with pepperoni, 6 chicken wings, but no salad", the dish classifier 214 determines which parts of this utterance refers to pizza. The dish classifier 214 model understands the history, e.g., there is a salad already in the cart (e.g., because it is included with chicken wings), and predicts the cart delta vector 216 to reflect how many pizzas and how many wings are there in the cart 126. The prediction of the dish classifier 214 indicates what is being added to and what is being deleted from the cart 126. Thus, based on the utterances 115 and the order context 120, the NLP pipeline 112 predicts the cart 126 and the dialog response 220. One or more of the classifiers 213, 214, 218 may use multiclass classification, a type of support vector machine. The intent classifier 213 determines intent(s) 244 of the utterances 115, e.g., is the intent 244 a menu-related question (e.g., "What toppings are on a Supreme pizza?" or a modification ("I'd link a large peperoni pizza") to the cart 126.

In some aspects, the menu 136 of the restaurant 132 of FIG. 1 may be represented as a ontology 250 (e.g., a set of menu items in the menu 136 that shows each menu item's properties and the relationships between menu items). In some aspects, the ontology 250 may be represented in the form of a vector. e.g., each type of pizza may have a corresponding vector representation. In some aspects, the menu representations may be generated from unlabeled data, to enable the NLP pipeline 112 to handle any type of information related to ordering, dishes, and food items.

The utterances 115 are used as input to the NLP pipeline 112. The utterances 115 may be in the form of a concatenated string of a set of previous utterances. The amount of utterances 115 provided to the NLP pipeline 112 may be based on how much latent knowledge of the conversation state 226 is desired to be maintained. The greater the amount of utterances 115, the better the conversation state 226. The utterances 115 may be a word, a phrase, a sentence, or multiple sentences (including incomplete sentences) that the customer provides to the software agent 116 at each turn in the conversation. For example, a typical conversation may include:

<agent> "This is XYZ pizza, how can I help you?"
<customer> "I'd like to order a large pepperoni pizza."
<agent> "Got it. Would you be interested in getting an extra large for two dollars more?"
<customer> "Okay, give me an extra large pepperoni."
<agent> "Would you like anything to drink?"
<customer> "Two bottles of water please."
<agent> "Got it. Anything else I can get for you? Dessert perhaps?"
<customer> "No. That will do it."
<agent> "Okay. Your total is $20.12. How would you like to pay?"
<customer> "Here is my credit card information <info>."
<agent? "Thanks. Please proceed to the pickup window when the display indicates your order is ready."

There are multiple turns in this example conversation, starting with "I'd like to order a large pepperoni pizza", with each turn including the customer's utterances 115 and the agent's response 220. The utterances 115 may thus include multiple sentences. In some aspects, chunking splitting may be performed, resulting in more than one representation corresponding to a unique utterance from the user. In some cases, the audio of the utterances 115 may be used as input, providing complementary features for emotion recognition, estimation of willingness to talk to AI, or for tackling issues as sidebar conversations. The satisfaction estimation based on vocal features also serves as a signal for optimizing the dialog policy.

The interaction history 222 includes contextual language information, such as, for example, the N previous utterances of the customer (N>0), the M previous responses from the software agent 116 (M>0). The cart state 224 includes current cart information. In some cases, a domain specific ontology 250 may be added as semantic representation of items in the knowledge base (e.g., the conversation data 136). The ontology 250 allows the encoder 210 to identify specific entities with which to select the correct modification to operate on the cart 126. The ontology 250 may be used to facilitate the onboarding of new items or whole semantic fields, alleviate the need for annotated data for each label (e.g., the entries of the employee into the EA-POS 102), and improve the performance of the NLP pipeline 112.

The encoder 210 creates the cart delta vector 216 that includes corresponding actions to update the cart 126 based on the most recent (e.g., latest turn) of the utterances 115.

The cart delta vector 216 may be a vector, e.g., a sparse array of numbers that corresponds to a state difference. For example, for a cart that includes "Large Pepperoni Pizza", "2 Liter Coke" and "Chicken Salad", if the most recent utterance is "A large coke, but remove the salad", then the encoder 210 may output [0, 1, −1]. In this way, both the quantity and the intent to remove are encompassed.

The encoder 210 determines the utterance vector 212, a numerical representation of each input (e.g., the utterances 115 and the order context 120) based on the pre-trained language model 232. The utterance vector 212 is a type of encoding, e.g., a set of symbols that represent a particular entity. For example, in some aspects, the encoding may be an array of real numbers, a vector (or a higher dimensional extension, such as a tensor), that is generated by a statistical language model from a large corpus of data. In addition to using the conversation data 136, the encoder 210 may leverage an additional corpus of data on multiple sites 234 (e.g., Wikipedia and the like), such as food-related sites, thereby enabling the encoder 210 to engage in specialized conversations, such as food-related conversations. In some cases, the encoder 210 may be trained to engage in conversations associated with a particular type of restaurant, e.g., a pizza restaurant, a chicken wings restaurant, a Mexican restaurant, an Italian restaurant, an Indian restaurant, a Middle Eastern restaurant, or the like.

The dish classifier 214 may predict the cart delta vector 216 by passing the encoded representations in the utterance vector 212 through additional neural dialog layers for classification, resulting in a sparse vector that indicates the corresponding element(s) within all possible cart actions, e.g., a comprehensive array of labels of possible combinations. The classifiers 213, 214, 218 may be trained using the conversation data 136. The ontology 250 provides information to precise the modifiers, relating cart actions that are highly related such as adding two different variations of the same dish.

The utterances 115 (e.g., representations of the conversation 111 of FIG. 1), along with the order context 120, may be used as the input to the encoder 210 to determine a particular one of the dialog policies 236 to select the next predicted response 220 of the software agent 116. Each particular one of the dialog policies 236 may be used to predict an appropriate response 220 from multiple candidate responses 238. In some cases, the dialog model 218 may use policy optimization with features such as emotion recognition, total conversation duration, or naturalness terms. The dialog response 220 may be fed back to the dialog model 218 as contextual information. In some cases, multitask learning algorithms that combine more than one similar task to achieve better results may be used with the encoder 210 to enable the encoder 210 to learn important aspects of language modeling that serve indirectly to the final downstream task, while allowing a controlled training process via the design of the learning curriculum. The multiple and auxiliary objective functions serve to leverage more error signals during training, and make the model learn proper representations of the elements involved. Semantic and structural information about the menu 136 is encoded into the ontology 250 and used to inform the later layers of the cart prediction system (e.g., dish classifier 214).

In some cases, curriculum learning may be used to design the order with which tasks of different types or complexity are fed to the encoder 210, the dish classifier 214, the intent classifier 213, the dialog model 218, or any combination thereof, to assist tackling different tasks or to perform prolonged training. In addition, to improve extended training processes, the systems and techniques described here may use continual learning, in which the encoder 210, the dish classifier 214, the intent classifier 213, the dialog model 218, or any combination thereof, are retrained as new conversation data is accumulated. In some cases, the continual learning may be performed with elastic weight consolidation to modulate optimization parameters. For example, continual learning along with incremental learning may be used for new classes, e.g., new dishes, sequentially adding them to the objective though training the same model.

Figure 3:
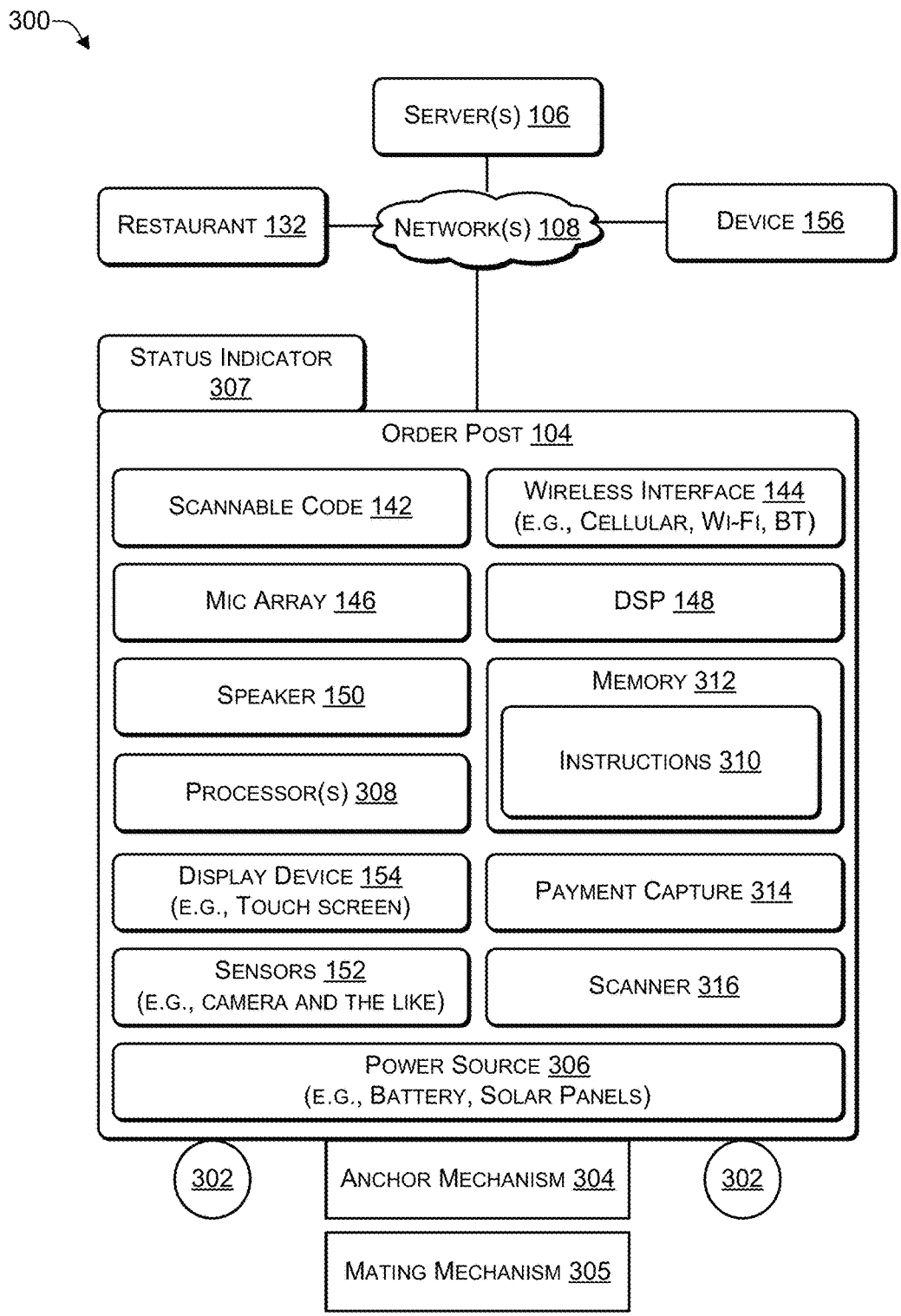
FIG. 3 is a block diagram illustrating components of an order post, according to some embodiments.

FIG. 3 is a block diagram 300 illustrating components of a representative order post, according to some embodiments. The representative order post 104 may include the scannable code 142, such as a quick reference (QR) code or the like. The wireless interface 144 may enable the order post 104 to communicate with the network 108 and, via the network 108, communicate with the server 106 and the restaurant 132. In some cases, the representative order post 104 may include one or more processors 308 capable of executing instructions 310 stored in a memory 312 to perform the various functions described herein.

In some cases, one or more of the order posts 104 may be permanently fixed at particular locations near the restaurant 132, such as in a drive-through area, a parking lot area, or the like. For example, newly constructed or newly refurbished restaurants may include one or more permanent order posts. In some cases, one or more of the order posts 104 may be temporarily placed at a particular location near the restaurant 132. For example, older restaurants may primarily use portable order posts that can be placed in a particular location during business hours and then stored inside the restaurant after hours. A restaurant may use a combination of fixed order posts and temporary order posts.

A portable order post 104 may have a power source 306, such as a rechargeable battery (e.g., lithium-ion (LiOn)), a means for recharging the batteries (e.g., a plug to tap into the power grid, solar panels, or the like), or other power-related components. The portable order post 104 may include a transportation mechanism 302 (e.g., wheels, rollers, tracks, or the like) to enable the order post 104 to be moved to a temporary location (e.g., at a particular time, such as at the beginning of each day) to handle increased drive-through traffic, e.g., instead of sending employees with ordering-taking tablets into the drive-through or parking lot area. At a particular time, such as at the end of each day, the portable order posts 104 may be transported (e.g., wheeled) back into the restaurant 132 and the rechargeable battery of the power source 306 recharged for the next usage.

The order post 104 may include an anchor mechanism 304 that temporarily or permanently anchors the order post 104 in a particular location. For example, the anchor mechanism 304 may include an attachment mechanism to temporarily or permanently couple the order post 104 in a particular location in a drive-through or parking lot or on a side of a building in which the restaurant 132 is housed. While the anchor mechanism 304 is illustrated on a bottom of the order post 104, in some cases the anchor mechanism 304 may be located on a side or a top of the order post 104. For example, the anchor mechanism may be a mechanical (e.g., interlocking components) mechanism, a magnet-based mechanism, an electromagnet-based mechanism, or any combination thereof. To illustrate, the order posts 104 have include two components: (i) a mating mechanism 305 to which (ii) the order posts 304 can be attached (or detached) using the anchor mechanism 304. For example, mating mechanism 305 may include a metal plate with a receptacle for the anchor mechanism 304. The anchor mechanism 304 may be attached magnetically or electro-magnetically to the mating mechanism 305. The mating mechanism 305 may be in the parking lot (e.g., drive through or curbside pickup) or on the side of a building in which the restaurant is located. In some cases, the drive-through and/or parking lot may include power receptacles and a communication port (e.g., Ethernet, universal serial bus (USB) or the like) into which the order taking device connects to. The order post 104 may be created using a ding resistant material, such as a metal, a polycarbonate, or carbon fiber.

The customer 128 may use the customer device 156 to initiate an order to the restaurant 132. The order posts 104 may be deployed in an area near a restaurant, such as a drive-thru area, a parking area, or the like. In some aspects, the order post 104 may include the scannable code 142. A customer 128 may use the device 156 (e.g., a smartphone) to scan the code 142. The code 142 may include information, such as a name of the restaurant 132, a location of the restaurant 132, and other restaurant-related information.

Scanning the code 142 may cause the device 156 to determine whether the app 162 is installed on the device 156. The app 162 may be associated with the restaurant 132. For example, if the restaurant 132 is part of a particular restaurant chain, then the app 162 may be associated with the particular restaurant chain. If the app 162 is not installed, the device 156 may automatically navigate to a software store (e.g., app store) and ask the customer 128 whether to install the app 162 on the device 156. If the customer 128 indicates to install the app 162, then the device 156 may install the app 162, identify the location of the restaurant 132 based information included in the code 142, open a menu 140 in the app 162, and enable the customer 128 to place an order with the restaurant 132. If the app 162 is already installed, scanning the code 142 using the device 156 may cause the app 162 to automatically open, automatically select the restaurant 132 based on the location specified by the code 142, and automatically display the menu 140 to enable the customer 128 to place an order. If the app 162 is not installed on the device 156 and if the customer 128 indicates that the app 162 is not to be installed, then the device 156 may automatically open a browser 164 and navigate to a website of the restaurant 132 to enable the customer 128 to place an order.

In some aspects, the order post 104 may include the wireless interface 144. The wireless interface 144 uses a wireless technology, such as, for example, a cellular technology (e.g., code division multiple access (CDMA), global system for mobile (GSM), universal mobile telephone system (UMTS), or the like), Wi-Fi, Bluetooth, another type of wireless technology, or any combination thereof, to communicate with the server 106 via the network 108. The wireless interface 144 may enable the order post 104 to communicate (e.g., via the network 108) with one of the software agents 116 on the server 106. For example, one of the software agents 116 may interact with a customer 128 to take an order.

The customer 128 may place an order by speaking towards the order post 104. In some cases, the order post 104 may respond to a "wake word" (Domino, Chick-fill, or the like) or "wake phrase" ("I'd like to order" or "I'd like to place an order") that, when spoken by the customer 128, causes the order post 104 to enter into an order-taking mode. The order post 104 may capture utterances 115 of the customer 128 using the microphone array 146. The microphone array 146 may include one or more microphones positioned in such a way that utterances from customers located in vehicles having different heights and located different distances from the order post 104 may be captured. For example, one of the microphones in the microphone array 146 may be used to capture ambient sounds in the surrounding area for noise cancellation purposes and used to remove noise from the audio captured by a remainder of the microphones in the microphone array 146. To illustrate, a phase of the audio (e.g., noise) captured by one of the microphones may be inverted (e.g., 180 degrees out of phase) relative to a phase of the audio captured by the remaining microphones to provide noise cancellation. In some cases, the audio may be filtered prior to inverting the phase. For example, in some aspects, a filter may be used to filter out voice frequencies in the phase of the non-voice frequencies may be inverted and mixed with the audio captured by the remaining microphones. In some aspects the digital signal processing module (DSP) module 148 may be used to modify frequencies and/or a phase of the audio captured by the microphone array 146 for better understanding of the utterances 115 by the AI engines 110 (e.g., by a speech detect engine). For example, the DSP module 148 may be used to perform noise cancellation. Thus, the DSP module 148 may modify the audio received by the microphone array 146 to increase machine intelligibility (e.g., rather than human intelligibility). The speaker 150 may be used to provide audio output of the responses 113 from the software agent 116.

In some cases, the order post 104 may include sensors 152 to detect the presence of a vehicle (e.g., determine when a vehicle is within a pre-determined distance of the order post) and/or enable the order post 104 to function as an autonomous vehicle and move from one vehicle to a next vehicle in an area (e.g., parking lot, drive-through, or the like). For example, the sensors to detect the presence of the customer 128 may include a camera, a directional Bluetooth sensor, a mass sensor, another type of sensor, or any combination thereof. In some cases, the camera may take a picture of the license plate of a vehicle in which the customer 128 is located and, if the customer 128 has previously given permission, look up the license plate to identify the customer 128.

In some aspects, the order post 104 may include the display device 154. The display device 154 may be used to display items from the menu 140, items that the customer 128 previously ordered (if the customer 128 is recognized), upsell items (e.g., display a hot item, such as a piece of pie or a cup of hot cider, when the weather is cold or display a cold item, such as an ice cream sundae or a milkshake, when the weather is hot), and the like. In some cases, the display device 154 may be touch sensitive and may be capable of receiving input 168 from the customer 128. For example, the customer 128 may place an order using a combination of the utterances 115 and the input 168.

In some cases, the order post 104 may include a status indicator 307. For example, the status indicator 307 may display green to indicate that the order post 104 is available to take an order and that the customer may drive the vehicle near the order post 104. The status indicator 307 may display yellow to indicate that the order post 104 is busy taking an order from a customer. The status indicator 307 may display a red to indicate that the order post 104 needs servicing.

In some cases, one of the AI engines 110 may perform traffic management by (i) directing vehicles to particular order posts 104, (ii) directing vehicles to a pick-up window to pick up an order, (iii) activate and deactivate the order posts 104 based on an amount of traffic, or any combination thereof. In such cases, the status indicator 307 may be used in a manner similar to how vehicles are directed through a car wash, e.g., green may indicate that a vehicle is to proceed to a next location, such as pickup window, red may indicate that the vehicle is to stop next to the order post 104 to place an order, and yellow may indicate that the vehicle is to proceed with caution, e.g., due to the presence of a large number of vehicles in the area, to the next location (e.g., pickup window).

The order posts 104 may, in some cases, include a payment capture 314 module, such as a "tap to pay" that uses near field communication to obtain credit card data when a credit card is held in close proximity to the payment capture 314 module. The order posts 104 may include a scanner 316 to scan a promotional (e.g., coupon) code, such as a QR code. For example, a customer may hold a paper coupon (e.g., with a promotional code) or a promotional code displayed on a smartphone (e.g., the device 156 of FIG. 1) near the scanner 316. The order post 104 may use the scanner 316 to scan the promotional code to take advantage of a promotion, such as a free item, discount, or the like.

In some aspects, the AI engines 110, the NLP pipeline 112, and the like may execute on at least one of the order posts 104. In such cases, one of the software agents 116 executing on a particular one of the order posts 104 may take an order and communicate the order to the restaurant 132. In this way, the order posts 104 may perform order processing at the edge, without involving the server 106. The advantage of such an arrangement is that a local area network (LAN), such as a Wi-Fi network or the like, that includes the order posts 104 and the restaurant 132 is able to process orders, e.g., without using a wide area network (WAN). Such a system may be deployed where a WAN is unavailable, provides intermittent connectivity, or is cost prohibitive.

A particular restaurant may deploy different types of order posts. For example, a first type of order post may include the scannable code 142 to enable customers to use the device 156 to place an order. A second type of order post may include the wireless interface 144, the microphone array 146, the DSP 148, and the speaker 150 but may not include the display device 154 (e.g., to reduce costs). A third type of order post may include the wireless interface 144, the microphone array 146, the DSP 148, the speaker 150, and the display device 154. Each of the different types of order posts may be either permanently installed or temporarily installed in a particular location. A particular restaurant may use one or more types of order posts, with some order posts being permanent while other order posts may be temporary.

Thus, a restaurant may deploy one or more order post such as the representative order post illustrated in FIG. 3. The restaurant may use permanently installed order posts, temporarily installed order posts, or a combination of both temporary and permanent order posts. Customers in vehicles that are lined up in a drive-through lane are able to place orders using the order posts, enabling the restaurant to process more orders in a shorter period of time (e.g., as compared to if the order posts were not present). Restaurants can thus decrease the time that customers wait in line, thereby increasing customer satisfaction, while increasing throughput and revenue. The restaurant can do so without hiring more employees, without asking employees to venture out in inclement weather, and without asking employees to venture out into an area with moving vehicles.

Figure 4:
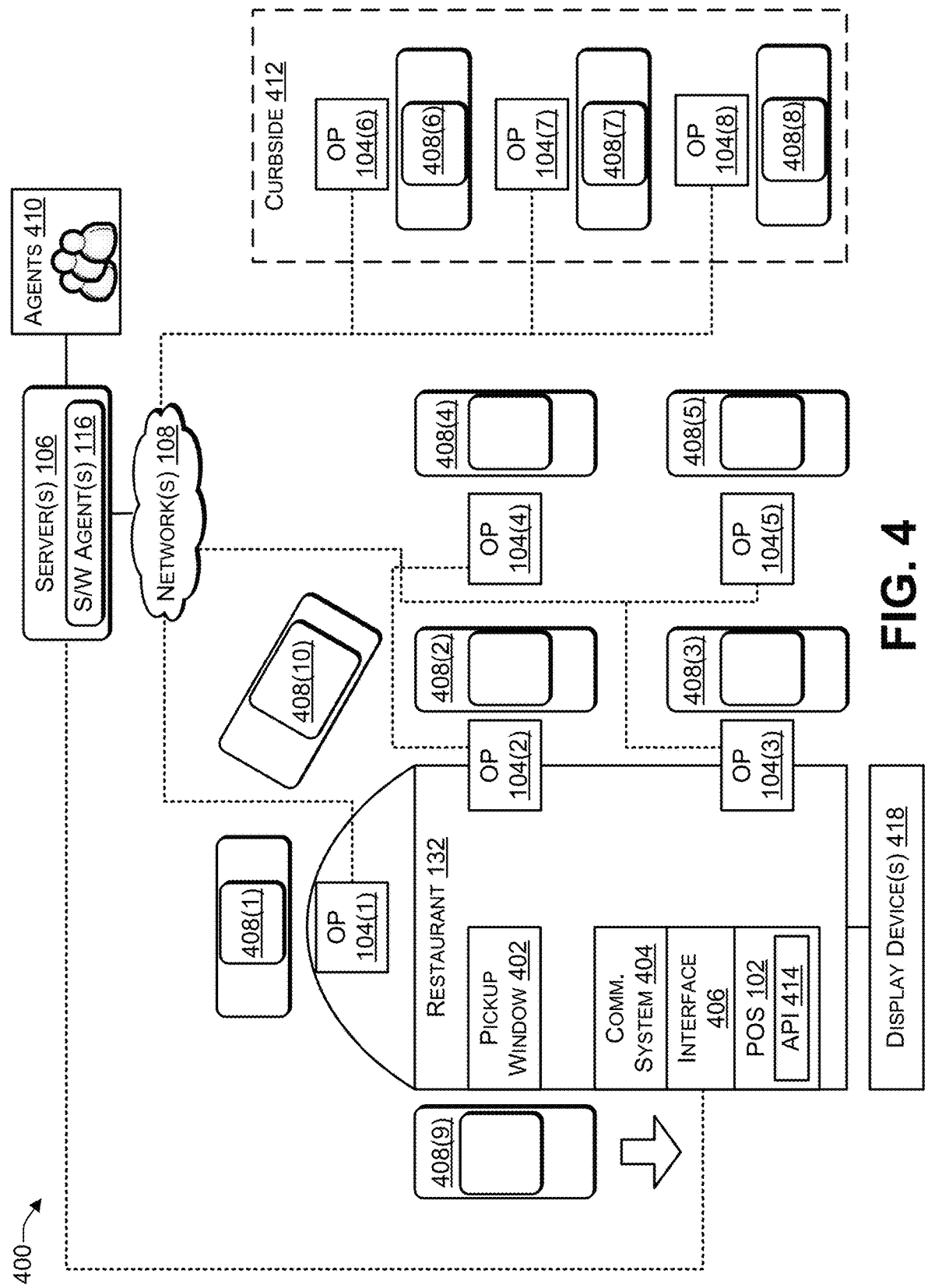
FIG. 4 is a block diagram illustrating order posts deployed in an area around a restaurant, according to some embodiments.

FIG. 4 is a block diagram 400 illustrating order posts deployed in an area (e.g., drive-through area and/or parking lot) around a restaurant, according to some embodiments. The restaurant 132 may have one or more pickup windows, such as a representative pickup window 402. The restaurant 132 may use a communication system 404 to enable employees to communicate with each other. For example, to use the communication system 404, each employee may wear a headset that includes a microphone and a speaker as well as a means for selecting particular employees with which to communicate. A communications interface 406 may interface between the communication system 404 and the server 106 hosting the software agents 116. Human agents 410 may be available in case an issue arises. For example, if an issue arises (e.g., software agent 116 cannot understand what the customer is saying) during a conversation between a customer and a software agent, the interface 406 may automatically escalate the issue by connecting the customer with one of the human agents 410. The communication system 404 may provide the human agent 410 contextual details associated with the order up to that point in time, such as which items are in the cart, what stage the order is in the order process, whether payment information has been provided, or the like. In this way, the human agent 410 resumes completing the order at the point where the order was transferred from the software agent 116 to the human agent 410, thereby avoiding frustrating the customer (e.g., the customer is not asked to start the order from the beginning). Each of the order posts 104 may, after receiving input (e.g., utterances and touch input), place a particular order with the restaurant 132 using an applications programming interface (API) 414 of the POS 102 system of the restaurant 132.

During peak times, such as around breakfast (6-10 AM), lunch (11 AM-1 PM), and dinner (4-8 PM), multiple vehicles 408 (e.g., 408(1), 408(2), 408(3), 408(4), 408(5), 408(6), 408(7), 408(8), 408(9), 408(10)) may be present in the area near the restaurant 132. Some of the vehicles, such as vehicles 408(1), 408(2), 408(3), 408(4), 408(5) maybe in a drive-through area and may have access to order posts 104(1), 104(2), 104(3), 104(4), 104(5), respectively. For example, the order posts 104(1), 104(2), 104(3) may be permanently fixed to a side of a building housing the restaurant 132 while the order posts 104(4), 104(5) may be temporarily located in the locations shown in FIG. 4. Of course, in other restaurants, zero or more of the order posts 104(1), 104(2), 104(3), 104(4), 104(5) may be permanently fixed at particular locations and zero or more of the order posts 104(1), 104(2), 104(3), 104(4), 104(5) may be temporarily located at particular locations.

The customer in the vehicle 408(9) is at the pickup window 402 to pick up a previously placed order. The customer in the vehicle 408(10) either (i) placed an order using one of the order posts 104(2), 104(3), 104(4), 104(5) and is waiting to go to the pickup window 402 or (ii) is waiting to place an order at the order post 104(1). One of the AI engines 110 of FIG. 1 may perform traffic management by (i) directing the vehicles 408 to particular order posts 104, (ii) directing the vehicles 408 to the pick-up window 402 to pick up an order, (iii) activate and deactivate the order posts 104 based on an amount of traffic, or any combination thereof. For example, some restaurants may include one or more display devices 418 (e.g., liquid crystal display (LCD), light emitting diode (LED) or the like) to enable one of the AI engines 110 to perform traffic management by displaying messages, such as "Order post N is available—vehicle with license plate XYZ, please proceed to order post N" (N>0), "Vehicle with license plate XYZ, your order is ready—please proceed to the pickup window." The display devices 418 may be sufficiently large that vehicles in the immediate vicinity (e.g., up to 15 feet from a sign) are able to view a particular one of the display devices 418.

In some cases, the restaurant 132 may set aside an area for curbside pickup 412, as shown in FIG. 4. Order posts 104(6), 104(7), 104(8) may be used by customers located in vehicles 408(6), 408(7), 408(8), respectively, to place orders with the software agents 116 or to pickup a previously placed order. Human employees may deliver the orders to the appropriate vehicles.

Thus, by using order posts (e.g., in permanently fixed locations, in temporary locations, or a combination of both), the restaurant can use the software agents 116 to receive orders from multiple customers in multiple vehicles substantially simultaneously. For example, as illustrated in FIG. 4, eight customers (e.g., in vehicles 408(1), 408(2), 408(3), 408(4), 408(5), 408(6), 408(7), 408(8)) may simultaneously place orders with the software agents 116 using the order posts 104(1), 104(2), 104(3), 104(4), 104(5), 104(6), 104(7), 104(8). The restaurant is able to significantly increase the number of orders that can be taken at the same time, thereby increasing throughput and revenue while decreasing the time a customer has to wait to place an order, thereby increasing customer satisfaction. In addition, the restaurant may not hire employees to go out into the drive-through or parking lot to take orders using a tablet, thereby saving the restaurant money.

In the flow diagrams of FIGS. 5, 6, 7, and 8 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, and 800 are described with reference to FIGS. 1, 2, 3 and 4 as described above, although other models, frameworks, systems and environments may be used to implement this process.

FIG. 5 is a flowchart of a process 500 that includes receiving a scan of a code displayed on an order post, according to some embodiments. The process 500 may be performed by a device associated with the customer, such as the device 156 of FIGS. 1, 2, and 3.

At 502, the process may perform a scan of a code displayed on an order post. At 504, the process may determine whether an app associated with the restaurant is installed. If the process determines, at 504 that the app associated with the restaurant is installed, the process may proceed to 512. If the process determines, at 504, that the app associated with a restaurant is not installed, the process may navigate to a site where the app can be downloaded (e.g., an app store) and ask a user (e.g., a customer) whether to install the app, at 506.

The process may determine, at 508, whether the user has given permission to install the app (e.g., on the device). If the process determines, at 508, that the user has given permission to install the app, the process may download and install the app (on the device), at 510. If the process determines, at 508, that the user has not given permission to install the app, then the process proceeds to 516. At 512, the process opens the app, selects the restaurant and location (e.g., based on information included in the code), and navigates to an ordering page. At 516, the process opens a browser, selects the restaurant and location (e.g., based on information in the code that was scanned), and navigates to an ordering page. For example, in FIG. 1, scanning the code 142 may cause the device 156 to determine whether the app 162 is installed on the device 156. The code 142 may include information such as the name of the restaurant 132, the location of the restaurant 132, where to download the app 162, or any combination thereof. The app 162 may be associated with the restaurant 132. If the app 162 is not installed, the device 156 may automatically navigate to a software store (e.g., app store) and ask the customer 128 whether to install the app 162 on the device 156. If the customer 128 indicates to install the app 162, then the device 156 may install the app 162, identify the location of the restaurant 132 based information included in the code 142, open a menu 140 in the app 162, and enable the customer 128 to place an order with the restaurant 132. If the app 162 is already installed, scanning the code 142 using the device 156 may cause the app 162 to automatically open, automatically select the restaurant 132 based on the location specified by the code 142, and automatically display the menu 140 to enable the customer 128 to place an order. If the app 162 is not installed on the device 156 and if the customer 128 indicates that the app 162 is not to be installed, then the device 156 may automatically open a browser 164 and navigate to a website of the restaurant 132 to enable the customer 128 to place an order. In some cases, the restaurant may specify that, rather than ask whether to install the app, if the app is not installed, the device's browser is opened to the restaurant's order page, e.g., if the process determines, at 504, that "no" the app is not installed, then the process may proceed to 516 (e.g., skipping 506 and 508).

At 514, the process initiates receiving an order (e.g., receive utterances and/or touch input from a customer). For example, in FIG. 1, the customer 128 may speak into the microphone 158, use a touchscreen of the display device 166, or both to provide order data when placing an order with the software agent 116.

Thus, a customer waiting in queue in a drive-through area or parking lot of a restaurant may scan, using a device such as a smartphone, a code displayed on a order post. The code may include information, such as an identity of the restaurant, a location of the restaurant, where to download the app, where an ordering site is located, other restaurant-related information, or any combination thereof. Scanning the code may open an app (e.g., ordering app) associated with the restaurant if the app is installed on the device. If the app is not installed, the device may ask if the customer desires to have the app installed. If the customer indicates to install the app, the device may download and install the app on the device. If the app is installed on the device, scanning the code may cause the app to automatically open and select a menu associated with the restaurant at the location where the customer is located. If the customer indicates to the device to not install the app, the device may open a browser and navigate to an ordering page associated with the location where the customer is located. The customer may use utterances, touch input provided to a touchscreen display device of the device, or both to place and pay for an order. In this way, a customer can complete an order while waiting in a drive-through line, curbside pickup area, or the like. The restaurant is able to receive multiple orders simultaneously (e.g., at peak times) and increase revenue by processing more orders in a particular time frame. In addition, the software agents always upsell and so the restaurant is be able to increase revenue by 15% to 20%, as compared to if human employees took the orders. The restaurant is able to increase customer satisfaction because customers do not wait in a queue for a long time and are instead able to place and pickup orders faster.

Figure 6:
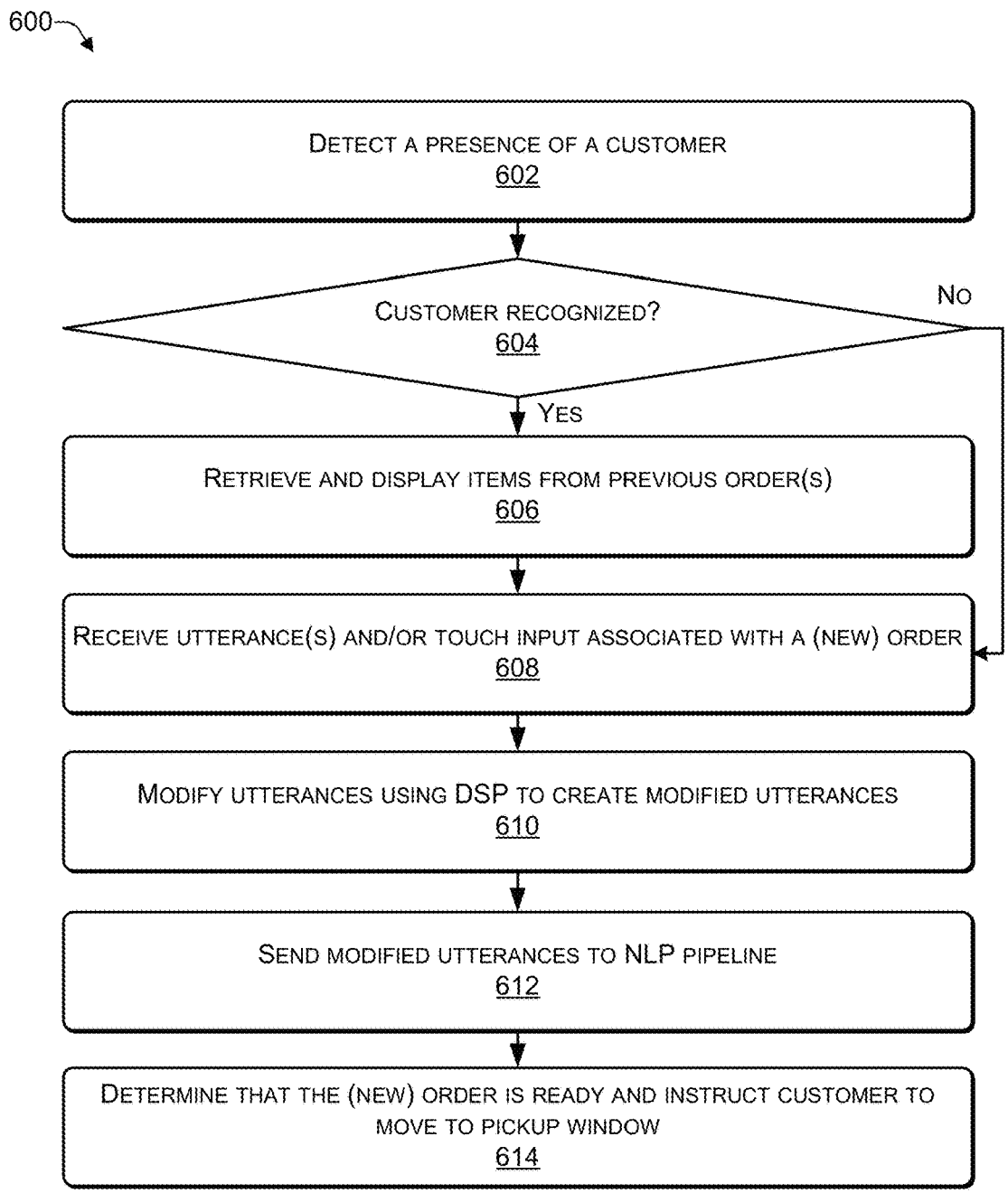
FIG. 6 is a flowchart of a process that includes detecting a presence of a customer, according to some embodiments.

FIG. 6 is a flowchart of a process 600 that includes detecting a presence of a customer, according to some embodiments. The process 600 may be performed by components of an order post, such as the order post 104 of FIGS. 1, 2, 3, and 4.

At 602, the process may detect a presence of a customer. At 604, the process determines whether the customer is recognized. If a determination is made, at 604, that the customer is recognized, then the process proceeds to 606. If a determination is made, at 604, that the customer is not recognized, then the process proceeds to 608. For example, in FIG. 1, the order post 104 may use one or more of the sensors 152 (e.g., a microphone, a camera, a directional Bluetooth sensor, a mass sensor, another type of sensor or any combination thereof) to detect the presence of a customer. For example, the order post 104 may detect the presence of a customer by detecting the presence of a vehicle (e.g., using a camera sensor), using the microphone to detect that a "wake word" (e.g., "Domino", "Chick-Fill", or the like) was spoken, using a camera to detect and identify a license plate of a vehicle in which the customer 128 is located, using the camera to perform facial recognition of the driver (or one of the passengers) to identify the customer 128, using voice recognition on a sound of the customer's voice to recognize the customer, using a nearfield communication (NFC) technology (e.g., Bluetooth or the like) to identify the device 156, or any combination thereof.

The process may determine whether the vehicle is recognizable and if recognizable determine the identity of the vehicle. For example, if the customer has created an account and added a license plate number, then the order post 104 may use a camera of the sensors 152 to determine a license plate of a vehicle and look up the license plate in a customer database to determine if the vehicle is associated with a customer that has previously registered the vehicle with the customer's account.

At 606, the process may retrieve and display items from one or more previous orders. For example, in FIG. 1, if the process is able to determine that the vehicle is associated with the customer's account, then the process may retrieve one or more previous orders and the items ordered in each of the one or more previous orders. The process may display one or more of the previously orders to make it easy for the customer to repeat an order or display previously ordered items to enable the customer to select from the previously ordered items.

At 608, the process may receive utterances and/or touch input associated with a new order. At 610, the process may modify the utterances using digital signal processing (BSP) to create modified utterances, e.g., the utterances 115. For example, in FIG. 1, the order post 104 may receive customer utterances from the microphone array 146 and process the utterances using the DSP 148 to create the utterances 115. The output of the DSP 148 may be the utterances 115 that are processed to enable the AI engines 110 to more easily perform speech-to-text conversion. The order post 104 may receive the input 168 via a touchscreen of the display device 154.

At 612, the process may send the utterances 115 created by the DSP 148 to the natural language processing (NLP) pipeline. At 614, the process may determine that the new order is ready and instruct the customer to move to a pickup window to collect the order. For example, in FIG. 1, the order post 104 may send the utterances 115 to the NLP pipeline 112. In some cases, the NLP pipeline 112 may be executing on one or more of the servers 106, while in other cases the NLP pipeline 112 may be executing on the order post 104 itself. The order post 104 may receive a notification from the restaurant 132 that the order is complete and ready for pickup. In response, the order post 104 may indicate (e.g., using the speaker 150, the display device 154, the device 156, or any combination thereof) to the customer 132 that the order is ready for pickup and instruct the customer 132 to drive their vehicle to the order pickup window (e.g., pickup window 402 of FIG. 4).

Thus, an order post may include sensors that enable the order post to recognize a vehicle by taking a picture of the license plate and looking up the license plate in a database to determine whether the license plate is associated with a particular customer's account. If the order post is able to recognize the vehicle's license plate, then the order posts may retrieve previous orders, previously ordered items, or both to enable the customer to repeat a previous order or to select previously ordered items. The customer may provide utterances in touch input to select a previous order or to select previously ordered items. The utterances may be processed using DSP to make the utterances easier for the AI engines and NLP pipeline to recognize.

Figure 7:
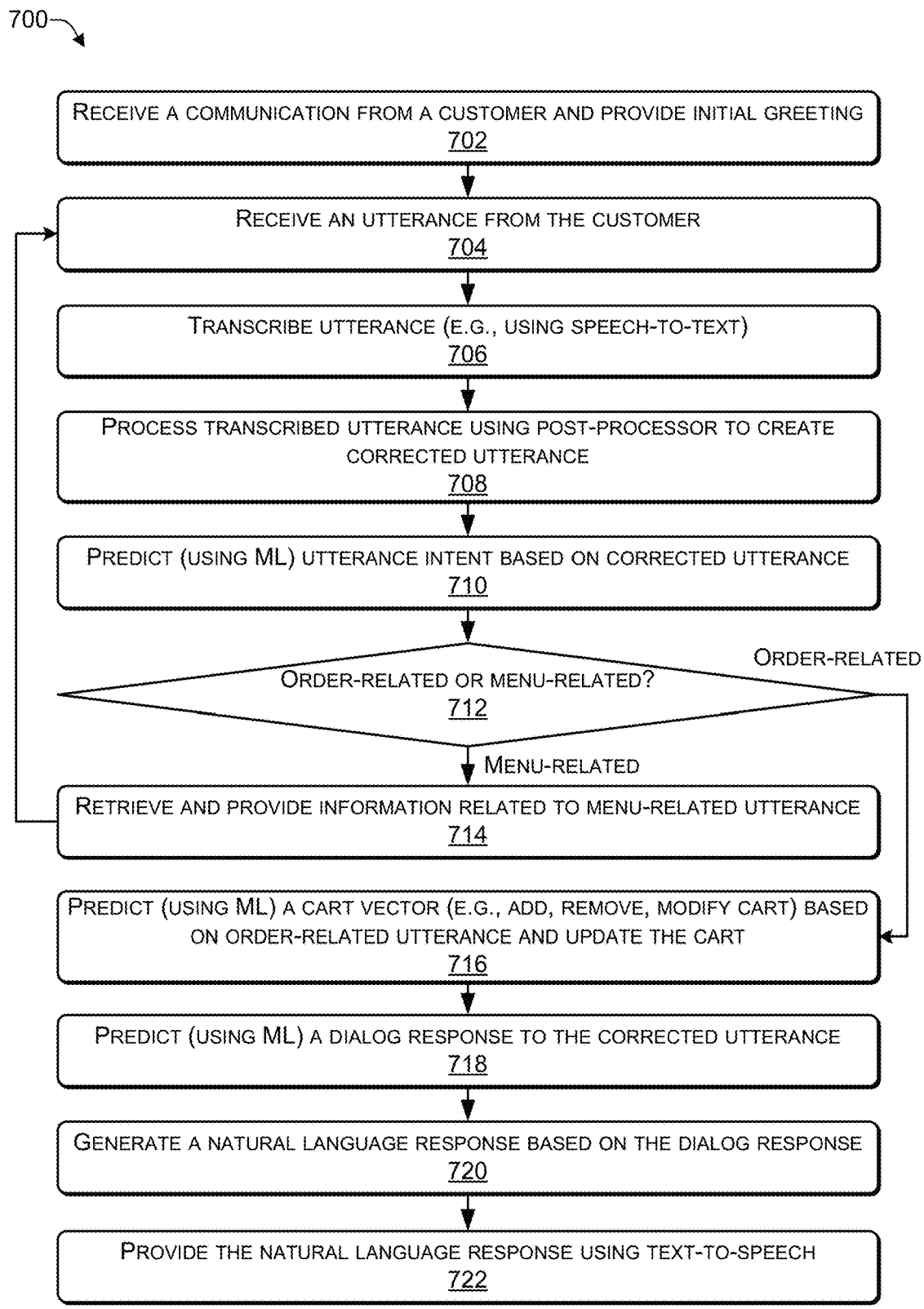
FIG. 7 is a flowchart of a process that includes predicting a cart vector, according to some embodiments.

FIG. 7 is a flowchart of a process 700 that includes predicting a cart vector, according to some embodiments. The process 700 may be performed by a server, such as the server 106 of FIGS. 1, 2, 3, and 4.

At 702, the process receives a communication from a customer and provides an initial greeting. At 704, the process receives an utterance from the customer. At 706, the process transcribes the utterance (e.g., using speech to text). At 708, the transcribed utterances processed using a post processor to create a corrected utterance. For example, in FIG. 1, the customer initiates a communication (call, text, chat, or the like) using the customer device 156. In response to receiving the customer-initiated communication, one of the software agents 116 provides an initial greeting. The software agent 116 receives a first of the customer utterances 115. In FIG. 2, one or more of the utterances 115 are converted to the audio 205 and processed using the speech-to-text converter 206 to create the text 207. The NLP post processor 208 may be used to process the text 207 to create the corrected utterance 209.

At 710, a classifier is used to predict an utterance intense based on the corrected utterance. At 712, the process determines whether the utterance intent is order-related or menu-related. If the process determines that the utterance intent is menu-related, at 712, then the process retrieves and provides information related to the menu-related utterance, at 714, and goes back to 704 to receive an additional utterance from the customer. If the process determines that the utterance intent is order-related, at 712, then the process predicts a cart vector (e.g., that adds, removes, and/or modifies a cart) based on the order related utterance and updates the cart based on the cart vector.

At 720, the process generates a natural language response based on the dialog response. At 722, the process provides a natural language response as speech using a text-to-speech converter. For example, in FIG. 2, the encoder 210 creates the utterance vector 212 which the dialog model 218 uses to create a natural language response in the form of the dialog response 220. The dialog response 220 is provided to the software agent 116 which converts it to speech using the text-to-speech converter 228.

Figure 8:
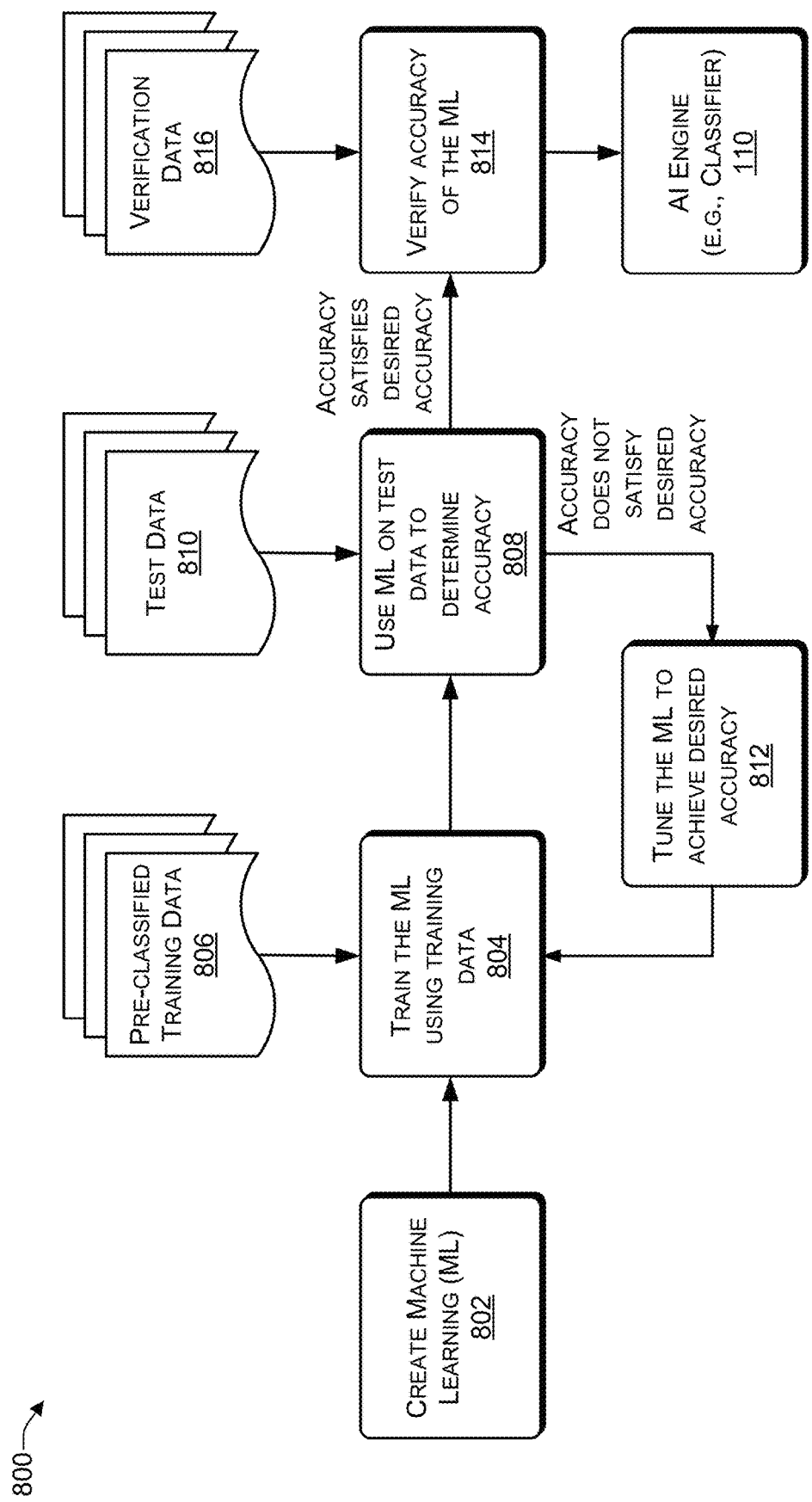
FIG. 8 is a flowchart of a process to train a machine learning algorithm to create a classifier, according to some embodiments.

FIG. 8 is a flowchart of a process 800 to train a machine learning algorithm to create a classifier, according to some embodiments. The process 700 may be performed by a server, such as the server 106 of FIGS. 1, 2, 3, and 4, to train the encoder 210, the dish classifier 214, the intent classifier 213, and the dialog model 218.

At 802, the machine learning algorithm (e.g., software code) may be created by one or more software designers. At 804, the machine learning algorithm may be trained using pre-classified training data 806 (e.g., a portion of the conversation data 136 that has been pre-classified). For example, the training data 806 may have been pre-classified by humans, by machine learning, or a combination of both. After the machine learning has been trained using the pre-classified training data 806, the machine learning may be tested, at 808, using test data 810 to determine an accuracy of the machine learning. For example, in the case of a classifier (e.g., support vector machine), the accuracy of the classification may be determined using the test data 810 (e.g., a portion of the conversation data 136 that has been pre-classified).

If an accuracy of the machine learning does not satisfy a desired accuracy (e.g., 95%, 98%, 99% accurate), at 808, then the machine learning code may be tuned, at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy.

After determining, at 808, that an accuracy of the machine learning satisfies the desired accuracy, the process may proceed to 814, where verification data 816 (e.g., a portion of the conversation data 136 that has been pre-classified) may be used to verify an accuracy of the machine learning. After the accuracy of the machine learning is verified, at 814, the machine learning 130, which has been trained to provide a particular level of accuracy may be used.

The process 800 may be used to train each of multiple machine learning algorithms (e.g., classifiers) described herein, such as the encoder 210, the dish classifier 214, the intent classifier 213, and the dialog model 218.

FIG. 9 illustrates an example configuration of a device 900 that can be used to implement the systems and techniques described herein, such as for example, the computing devices 102, the consumer device 156, and/or the server 106 of FIG. 1. For illustration purposes, the device 900 is illustrated in FIG. 9 as implementing the server 106 of FIG. 1.

The device 900 may include one or more processors 902 (e.g., CPU, GPU, or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 902 are one or more hardware devices that may include a single processing unit or a number of processing units, all of which may include single or multiple computing units or multiple cores. The processors 902 may include a graphics processing unit (GPU) that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data via the network 110. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 116 and mass storage devices 912, may be used to store software and data, including, for example, the dictionary 118, the classifiers 210, 213, 214, 218, the NLP pipeline 112, the order context 120, the recommendations 114, and the software agents 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An order post comprising:
   a speaker;
   one or more sensors;
   a transportation mechanism, wherein:
      the transportation mechanism is used to temporarily move the order post to a location that is proximate to a restaurant prior to a particular time period; and
      the transportation mechanism is used to remove the order post from the location after the particular time period has lapsed;
   one or more processors;
   a memory device to store instructions executable by the one or more processors to perform operations comprising:
      detecting, by the one or more sensors, a presence of a customer;
      determining an identity of the customer;
      retrieving one or more previous orders placed by the customer;
      indicating at least one item included in the one or more previous orders;
      receiving an order from the customer, the order comprising input that includes an utterance of the customer;
      modifying, using digital signal processing, the utterance to create a modified utterance;
      sending the modified utterance to a software agent comprising a natural language processor and one or more classifiers;
      receiving a predicted response to the modified utterance from the software agent;
      playing back the predicted response via the speaker;
      determining that the order is complete;

receiving payment information for the order from the customer;
sending order data associated with the order to the restaurant;
receiving an indication from the restaurant that the order is ready for pickup; and
instructing the customer to pick up the order.

2. The order post of claim 1, wherein detecting, by the one or more sensors, the presence of the customer comprises at least one of:
determining, using a microphone of the one or more sensors, that the customer uttered a wake word;
determining, using a camera of the one or more sensors, that a vehicle of the customer is within a predetermined distance of the order post;
using a nearfield communication technology to detect a presence of a device associated with the customer; or
any combination thereof.

3. The order post of claim 1, wherein determining the identity of the customer comprises:
identifying a license plate of a vehicle of the customer using a camera of the one or more sensors;
performing facial recognition, using the camera of the one or more sensors, on a face of the customer;
performing voice recognition, using a microphone of the one or more sensors, on the utterance of the customer;
identifying a device associated with the customer using a nearfield communication technology, wherein the device comprises a smartphone of the customer or a smart interface device included in the vehicle of the customer; or
any combination thereof.

4. The order post of claim 1, wherein:
the digital signal processing is used to modify the utterance to enable the software agent to perform speech-to-text conversion of the modified utterance.

5. The order post of claim 1, wherein:
the at least one item is included in greater than fifty percent of the one or more previous orders.

6. The order post of claim 1, further comprising:
a communications interface comprising at least one of a cellular interface, a Wi-Fi interface, a Bluetooth interface, an Ethernet connection, or any combination thereof.

7. The order post of claim 1, further comprising:
an anchor mechanism to enable the order post to be temporarily anchored at the location.

8. The order post of claim 7, wherein:
the order post is capable of travelling autonomously, using the transportation mechanism and the one or more sensors, within an area proximate to the restaurant.

9. The order post of claim 1, further comprising a power source comprising:
a rechargeable battery;
one or more solar cells; or
any combination thereof.

10. The order post of claim 1, further comprising:
a touchscreen display device, wherein the input further includes touch input received by the touchscreen display device.

11. The order post of claim 1, wherein:
the software agent is executed by the one or more processors of the order post.

12. The order post of claim 1, wherein:
the software agent is executed by a server that is connected to the order post via a network.

13. The order post of claim 1, wherein detecting, by the one or more sensors, the presence of the customer comprises:
determining, using a microphone of the one or more sensors, that the customer has uttered a wake word.

14. The order post of claim 1, further comprising:
a status indicator to indicate whether the order post is available, unavailable, or out of service.

15. One or more non-transitory computer-readable media storing instructions executable by one or more processors to perform operations comprising:
determining that an order post has been temporarily moved, using a transportation mechanism of the order post, to a location that is proximate to a restaurant prior to a particular time period, wherein the transportation mechanism is used to remove the order post from the location after the particular time period has lapsed;
detecting, by one or more sensors of the order post, a presence of a customer;
determining an identity of the customer;
retrieving one or more previous orders placed by the customer;
displaying at least one item included in the one or more previous orders;
receiving an order from the customer, the order comprising input that includes an utterance of the customer;
modifying, using digital signal processing, the utterance to create a modified utterance;
sending the modified utterance to a software agent comprising a natural language processor and one or more classifiers;
receiving a predicted response to the modified utterance from the software agent;
playing back the predicted response via a speaker of the order post;
determining that the order is complete;
receiving payment information for the order from the customer;
sending order data associated with the order to the restaurant;
receiving an indication from the restaurant that the order is ready for pickup; and
instructing the customer to pick up the order.

16. The one or more non-transitory computer readable media of claim 15, wherein detecting, by the one or more sensors, the presence of the customer comprises at least one of:
determining, using a microphone of the one or more sensors, that the customer uttered a wake word;
determining, using a camera of the one or more sensors, that a vehicle of the customer is within a predetermined distance of the order post;
using a nearfield communication technology to detect a presence of a device associated with the customer; or
any combination thereof.

17. The one or more non-transitory computer readable media of claim 15, wherein determining the identity of the customer comprises:
identifying a license plate of a vehicle of the customer using a camera of the one or more sensors;
performing facial recognition, using the camera of the one or more sensors, on a face of the customer;
performing voice recognition, using a microphone of the one or more sensors, on the utterance of the customer;
identifying a device associated with the customer using a nearfield communication technology, wherein the device comprises a smartphone of the customer or a smart interface device included in the vehicle of the customer; or any combination thereof.

18. A method performed by an order post, the method comprising:
   determining that the order post has been temporarily moved, using a transportation mechanism of the order post, to a location that is proximate to a restaurant prior to a particular time period, wherein the transportation mechanism is used to remove the order post from the location after the particular time period has lapsed;
   detecting, by one or more sensors of the order post, a presence of a customer;
   determining, by the order post, an identity of the customer;
   retrieving, by the order post, one or more previous orders placed by the customer;
   indicating, by the order post, at least one item included in the one or more previous orders;
   receiving, by the order post, an order from the customer, the order comprising input that includes an utterance of the customer;
   modifying, using digital signal processing, the utterance to create a modified utterance;
   sending, by the order post, the modified utterance to a software agent comprising a natural language processor and one or more classifiers;
   receiving, by the order post, a predicted response to the modified utterance from the software agent;
   playing back the predicted response via a speaker of the order post;
   determining, by the order post, that the order is complete;
   receiving, by the order post, payment information for the order from the customer;
   sending, by the order post, order data associated with the order to the restaurant;
   receiving, by the order post, an indication from the restaurant that the order is ready for pickup; and
   instructing, by the order post, the customer to pick up the order.

19. The method of claim 18, wherein detecting, by the one or more sensors, the presence of the customer comprises at least one of:
   determining, using a microphone of the one or more sensors, that the customer uttered a wake word;
   determining, using a camera of the one or more sensors, that a vehicle of the customer is within a predetermined distance of the order post;
   using a nearfield communication technology to detect a presence of a device associated with the customer; or
   any combination thereof.

20. The method of claim 18, wherein determining the identity of the customer comprises:
   receiving, by the software agent, a third utterance from the customer;
   identifying a license plate of a vehicle of the customer using a camera of the one or more sensors;
   performing facial recognition, using the camera of the one or more sensors, on a face of the customer;
   performing voice recognition, using a microphone of the one or more sensors, on the utterance of the customer;
   identifying a device associated with the customer using a nearfield communication technology, wherein the device comprises a smartphone of the customer or a smart interface device included in the vehicle of the customer; or
   any combination thereof.

* * * * *